United States Patent
Rakib

(10) Patent No.: US 10,574,317 B2
(45) Date of Patent: Feb. 25, 2020

(54) SYSTEM AND METHOD FOR PROVIDING WIRELESS COMMUNICATION SERVICES USING CONFIGURABLE BROADBAND INFRASTRUCTURE SHARED AMONG MULTIPLE NETWORK OPERATORS

(71) Applicant: Cohere Technologies, Inc., Santa Clara, CA (US)

(72) Inventor: Selim Shlomo Rakib, Santa Clara, CA (US)

(73) Assignee: Cohere Technologies, Inc.

( * ) Notice: Subject to any disclaimer, the term of this patent is extended or adjusted under 35 U.S.C. 154(b) by 114 days.

(21) Appl. No.: 15/187,671

(22) Filed: Jun. 20, 2016

(65) Prior Publication Data
US 2017/0019297 A1 Jan. 19, 2017

Related U.S. Application Data

(60) Provisional application No. 62/181,691, filed on Jun. 18, 2015.

(51) Int. Cl.
*H04B 7/06* (2006.01)
*H04W 88/08* (2009.01)

(52) U.S. Cl.
CPC ........ *H04B 7/0613* (2013.01); *H04W 88/085* (2013.01)

(58) Field of Classification Search
None
See application file for complete search history.

(56) References Cited

U.S. PATENT DOCUMENTS 4,754,493 A 6/1988 Coates
5,083,135 A 1/1992 Nagy et al.
(Continued)

FOREIGN PATENT DOCUMENTS

CN 1376338 A 10/2002
CN 1579077 A 2/2005
(Continued)

OTHER PUBLICATIONS

Office Action for U.S. Appl. No. 13/117,119, dated Aug. 5, 2013.
(Continued)

*Primary Examiner* — Kevin M Cunningham
(74) *Attorney, Agent, or Firm* — Cooley LLP

(57) ABSTRACT

System and method designed to allow different wireless carriers to provide wireless services using configurable infrastructure. The method includes receiving, from a first wireless network operator, first virtual RF configuration information and receiving, from a second wireless network operator, second virtual RF configuration information. A first portion of the configurable infrastructure and a first set of a plurality of physical antennas may then be configured, based upon the first virtual RF configuration information, into a first virtual RF configuration including a first virtual antenna. A second portion of the configurable infrastructure and a second set of the plurality of physical antennas may then be configured, based upon the second virtual RF configuration information, into a second virtual RF configuration including a second virtual antenna. Connections are established between the configurable infrastructure and wireless subscriber devices in accordance with the virtual RF configurations.

23 Claims, 8 Drawing Sheets

(56) References Cited

U.S. PATENT DOCUMENTS

| | | |
|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,654,429 B1 | 11/2003 | Li |
| 6,704,366 B1 | 3/2004 | Combes et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,689,049 B2 | 3/2010 | Monro |
| 7,773,685 B2 | 8/2010 | Tirkkonen et al. |
| 7,864,836 B1 | 1/2011 | Zhidkov |
| 7,864,877 B2 | 1/2011 | Hottinen |
| 8,155,658 B1 | 4/2012 | Gunasekara et al. |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 8,983,511 B2 | 3/2015 | Koo et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,537,575 B2 | 1/2017 | Ashrafi et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 9,866,363 B2 | 1/2018 | Rakib et al. |
| 9,893,922 B2 | 2/2018 | Rakib et al. |
| 9,900,048 B2 | 2/2018 | Hadani et al. |
| 9,912,507 B2 | 3/2018 | Rakib |
| 9,929,783 B2 | 3/2018 | Rakib et al. |
| 9,967,758 B2 | 5/2018 | Hadani et al. |
| 10,003,487 B2 | 6/2018 | Rakib et al. |
| 10,020,854 B2 | 7/2018 | Hadani et al. |
| 10,090,972 B2 | 10/2018 | Hadani et al. |
| 10,090,973 B2 | 10/2018 | Hadani et al. |
| 10,341,155 B2 | 7/2019 | Hadani et al. |
| 10,411,843 B2 | 9/2019 | Rakib et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0086027 A1 | 5/2004 | Shattil |
| 2004/0131011 A1 | 7/2004 | Sandell et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0136943 A1 | 6/2005 | Banerjee et al. |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211814 A1 | 9/2007 | Walton et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0273624 A1 | 11/2008 | Kent et al. |
| 2008/0310383 A1 | 12/2008 | Kowalski |
| 2008/0310485 A1 | 12/2008 | Soliman et al. |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0040154 A1 | 2/2010 | Carbonelli et al. |
| 2010/0073232 A1 | 3/2010 | Sajuyigbe et al. |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0203841 A1 | 8/2010 | Hwang et al. |
| 2010/0208676 A1 | 8/2010 | Li et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286498 A1 | 11/2011 | Abrishamkar et al. |
| 2011/0286502 A1 | 11/2011 | Adachi et al. |
| 2011/0287778 A1 | 11/2011 | Levin et al. |
| 2011/0289391 A1 | 11/2011 | Breiling et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Rius et al. |
| 2012/0021769 A1 | 1/2012 | Lindoff et al. |
| 2012/0045995 A1 | 2/2012 | Nakano et al. |
| 2012/0051457 A1 | 3/2012 | Ma et al. |
| 2012/0120970 A1 | 5/2012 | Wang et al. |
| 2012/0140716 A1 | 6/2012 | Baldemair et al. |
| 2012/0170531 A1 | 7/2012 | Prasad et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |

(56) References Cited

U.S. PATENT DOCUMENTS

| | | |
|---|---|---|
| 2012/0272117 A1 | 10/2012 | Stadelmeier et al. |
| 2012/0306685 A1 | 12/2012 | Asanuma et al. |
| 2012/0320994 A1 | 12/2012 | Loghin et al. |
| 2013/0003789 A1 | 1/2013 | Eom et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0128932 A1 | 5/2013 | Huang et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0010171 A1* | 1/2014 | Morrill .......... H04W 88/10 370/329 |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0177751 A1 | 6/2014 | Tomeba et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0043525 A1 | 2/2015 | Jiang et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0164587 A1* | 6/2016 | Pu .......... H04W 16/28 370/328 |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0117994 A1 | 4/2017 | Ashrafi et al. |
| 2017/0149594 A1 | 5/2017 | Rakib |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2017/0288710 A1 | 10/2017 | Delfeld et al. |
| 2017/0324601 A1 | 11/2017 | Hadani et al. |
| 2017/0346665 A1 | 11/2017 | Hadani et al. |

FOREIGN PATENT DOCUMENTS

| | | |
|---|---|---|
| CN | 1972272 A | 10/2010 |
| EP | 1432168 A1 | 6/2004 |
| EP | 2375604 A1 | 11/2011 |
| EP | 3314836 A1 | 5/2018 |
| EP | 3378187 A1 | 9/2018 |
| EP | 2865153 | 12/2018 |
| JP | 2005-528814 A | 9/2005 |
| JP | 2008-544602 A | 12/2008 |
| JP | 2011-127910 | 6/2011 |
| JP | 2014-150469 A | 8/2014 |
| WO | WO-03/028400 A1 | 4/2003 |
| WO | WO-2006/132589 A2 | 12/2006 |
| WO | WO 2007/004297 | 1/2007 |
| WO | WO 2011/105704 | 1/2011 |
| WO | WO 2011/137699 A1 | 11/2011 |
| WO | WO 2011/150315 A3 | 12/2011 |
| WO | WO 2013/148546 A1 | 10/2013 |
| WO | WO 2014/004585 | 1/2014 |
| WO | WO 2016/014596 | 1/2016 |
| WO | WO 2016/014598 | 1/2016 |
| WO | WO 2016/176642 | 11/2016 |
| WO | WO 2016/183230 | 11/2016 |
| WO | WO 2016/183240 | 11/2016 |
| WO | WO 2016/209848 | 12/2016 |
| WO | WO 2017/003952 | 1/2017 |
| WO | WO 2017/011478 | 1/2017 |

OTHER PUBLICATIONS

Notice of Allowance for U.S. Appl. No. 13/117,119, dated Feb. 28, 2014.
International Search Report and Written Opinion for International Application No. PCT/US2011/038302, dated Nov. 15, 2011.
International Preliminary Report on Patentability for International Application No. PCT/US2011/038302, dated Jun. 4, 2012.
Office Action for U.S. Appl. No. 13/117,124, dated Feb. 22, 2013.
Notice of Allowance for U.S. Appl. No. 13/117,124 dated Aug. 8, 2013.
Examination Report for Australian Application No. 2013280487, dated May 2, 2016.
Supplementary European Search Report for European Application No. 13809004.8, dated Apr. 14, 2016, 8 pages.
Office Action for Japanese Application No. 2015-518647, dated Jul. 7, 2015, 10 pages.
Notice of Allowance for U.S. Appl. No. 13/927,087, dated Feb. 25, 2015.
Office Action for U.S. Appl. No. 13/927,087, dated Nov. 12, 2014.
International Search Report and Written Opinion for International Application No. PCT/US2013/047723 dated Oct. 29, 2013.
International Preliminary Report on Patentability for International Application No. PCT/US2013/047723 dated Dec. 31, 2014.
Notice of Allowance forU.S. Appl. No. 13/927,088, dated Feb. 18, 2015.
Office Action for U.S. Appl. No. 13/927,088, dated Nov. 28, 2014.
Notice of Allowance for U.S. Appl. No. 13/927,086, dated Dec. 26, 2014.
Notice of Allowance for U.S. Appl. No. 13/927,086, dated Mar. 19, 2015.
Office Action for U.S. Appl. No. 13/927,086, dated Oct. 14, 2014.
Office Action for U.S. Appl. No. 13/927,089, dated Dec. 24, 2014.
Office Action for U.S. Appl. No. 13/927,089, dated Aug. 14, 2015, 7 pages.
Supplemental Notice of Allowability for U.S. Appl. No. 13/927,091 dated Jun. 11, 2015.
Notice of Allowance for U.S. Appl. No. 13/927,091 dated Apr. 24, 2015.
Office Action for U.S. Appl. No. 13/927,091 dated Jan. 27, 2015.
Office Action for U.S. Appl. No. 13/927,092 dated Oct. 8, 2014.
Notice of Allowance for U.S. Appl. No. 13/927,092 dated Oct. 24, 2014.
Office Action fpr U.S. Appl. No. 13/927,095, dated Apr. 30, 2015, 11 pages.
Office Action fpr U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.

(56) References Cited

OTHER PUBLICATIONS

Office Action for U.S. Appl. No. 14/754,596, dated Apr. 19, 2016, 18 pages.
Office Action for U.S. Appl. No. 14/809,129, dated Jul. 19, 2016, 5 pages.
Patent Examination Report No. 1 for Australian Application No. 2013239970, dated Dec. 8, 2015, 3 pages.
Supplementary European Search Report for European Application No. 13768150.8, dated Oct. 30, 2015, 7 pages.
International Search Report and Written Opinion for International Application No. PCT/US2013/033652, dated Jun. 12, 2013.
"AT&T Investor Report," 2014. [Online]. Available: http://www.att.com/Investor/ATT_Annual/2014/att_introduces_new_concepts_for_telecom_network.html.
Banelli, P. et al., "Modulation Formats and Waveforms for 5G Networks: Who Will Be the Heir of OFDM?," IEEE Signal Processing Magazine, pp. 80-93, 2014.
Catt, "UL Ackinack transmission methods for LTE-A", 3GPP Draft; RAN WG1 R1-102453, Apr. 7, 2010 (Apr. 7, 2010), Beijing, China, XP050419703.
Gurevich et al. "Group Representation Design of Digital Signals and Sequences", S.W. Golomb et al. (Eds.): SETA2008, LNCS 5203, pp. 153-166 (2008).
Holma, H. et al., "LTE for UMTS- OFDMA and SCFDMA Based Radio Access". Jan. 1, 2009 (Jan. 1, 2009 ), John Wiley & Sons, United Kingdom, XP002728837. See pp. 83-135.
Mecklenbrauker, W., "A Tutorial on Non-Parametric Bilinear Time-Frequency Signal Representations," Time and Frequency Representation of Signals and Systems (Eds. G Longo and B. Picinbono), vol. 309, pp. 11-68, 1989.
Nehorai et al., "MURI: Adaptive waveform design for full spectral dominance," [online], Mar. 11, 2011 [Retrieved on May 11, 2013, Retrieved from the Internet <URL: http://oai.dtic.mil/oai/oai?verb=getRecord&metadataPrefix=html&identifier=ADA565420>.
Rachid, J. E. et al., "NGMN 5G Initiative White Paper," Feb. 17, 2015. [Online]. Available: https://www.ngmn.org/uploads/media/NGMN_5G_White_Paper_V1_0.pdf.
Rusek, F. et al., "Scaling Up MIMO, Opportunities and Challenges with Very Large Arrays," IEEE Signal Processing Magazine, pp. 40-60, 2013.
Vodafone, "Cellular Internet of Things: Architectural Aspects," in 3GPP RAN#68, Malmo, Sweden, 2015.
Examination Report No. 1 for Australian Application No. 2017200197, dated Oct. 26, 2017, 3 pages.
Notice of Reasons for Rejection for Japanese Application No. 2015-198228, dated Mar. 20, 2018, 5 pages.
Office Action for U.S. Appl. No. 15/601,959, dated May 30, 2018, 8 pages.
Office Action for U.S. Appl. No. 15/617,962, dated Sep. 6, 2017, 10 pages.
Office Action for U.S. Appl. No. 15/617,962, dated Feb. 27, 2018, 10 pages.
Office Action for U.S. Appl. No. 15/374,989, dated Jan. 31, 2018, 8 pages.
Office Action for U.S. Appl. No. 15/258,970, dated Oct. 11, 2017, 10 pages.
Office Action for U.S. Appl. No. 15/258,970, dated Jan. 10, 2018, 7 pages.
Notice of Allowance for U.S. Appl. No. 15/258,970, dated May 9, 2018, 8 pages.
Office Action for U.S. Appl. No. 15/374,995, dated Aug. 7, 2017, 6 pages.
Office Action for U.S. Appl. No. 15/269,793, dated Mar. 9, 2018, 10 pages.
Notice of Allowance for U.S. Appl. No. 15/269,793, dated May 25, 2018, 11 pages.
Notice of Allowance for U.S. Appl. No. 15/478,174, dated Apr. 25, 2018, 9 pages.
Notice of Allowance for U.S. Appl. No. 15/407,941, dated Apr. 27, 2018, 7 pages.
Office Action for U.S. Appl. No. 15/188,946, dated Oct. 31, 2017, 16 pages.
Office Action for U.S. Appl. No. 15/208,545, dated Aug. 21, 2017, 15 pages.
International Search Report and Written Opinion for International Application No. PCT/US2016/030259, dated Aug. 4, 2016, 13 pages.
International Search Report and Written Opinion for International Application No. PCT/US2016/031928, dated Oct. 7, 2016, 10 pages.
Supplementary European Search Report for European Application No. 11787483.4, dated Sep. 9, 2014, 6 pages.
Communication Pursuant to Article 94(3) EPC for European Application No. 13809004.8, dated Feb. 17, 2017, 5 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
International Search Report and Written Opinion for International Application No. PCT/US2016/039662, dated Nov. 29, 2016, 14 pages.
International Search Report and Written Opinion for International Application No. PCT/US2016/041940, dated Oct. 20, 2016, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.
Office Action for U.S. Appl. No. 14/605,957, dated Jun. 22, 2017, 6 pages.
International Search Report and Written Opinion for International Application No. PCT/US2017/025797, dated Jun. 21, 2017, 6 pages.
Office Action for U.S. Appl. No. 15/152,464, dated Apr. 6, 2017, 10 pages.
Office Action for U.S. Appl. No. 15/188,946, dated May 8, 2017, 14 pages.
Office Action for U.S. Appl. No. 15/194,494, dated May 5, 2017, 16 pages.
Office Action for U.S. Appl. No. 15/436,653, dated Jun. 2, 2017, 10 pages.
Office Action for U.S. Appl. No. 15/617,962, dated Aug. 14, 2018, 12 pages.
Berger, C. R. et al. (2008) "Compressed Sensing for OFDM/MIMO Radar", IEEE, pp. 213-217.
Office Action for U.S. Appl. No. 15/143,323, dated Dec. 4, 2018, 27 pages.
Extended European Search Report for European Application No. 16787273.8, dated Nov. 26, 2018, 10 pages.
Extended European Search Report for European Application No. 17776920.5, dated Sep. 23, 2019, 9 pages.
Wunder, G. et al., "Sparse Signal Processing Concepts for Efficient 5G System Design", IEEE Access, vol. 3, pp. 195-208, Mar. 31, 2015, 14 pages.
Cohere Technologies, "5G Air Interface Waveforms", 3GPP RAN workshop on 5G; RWS-150034; Phoenix, USA, Sep. 17-18, 2015, 10 pages.
Extended European Search Report for European Application No. 16793474.4, dated Dec. 19, 2018, 7 pages.
Extended European Search Report for European Application No. 16825056.1, dated Jan. 24, 2019, 11 pages.

(56) References Cited

OTHER PUBLICATIONS

Cohere Technologies et al: "OTFS Modulation Waveform and Reference Signals for New Rat", 3GPP Draft; R1-163619 OTFS Waveform for New Rat, 3rd Generation Partnership Project (3GPP), Mobile Competence Centre; 650, Route Des Lucioles ; F-06921 Sophia-Antipolis Cedex; France vol. RAN WG1, No. Busan, South Korea; Apr. 15, 2016, Apr. 18, 2016, XP051090363, Retrieved from the Internet: URL:http://www.3gpp.org/ftp/tsg_ran/WG1RI-I /TSGRI 84b/Docs/ [retrieved on Apr. 18, 2016].
Notice of Allowance for U.S. Appl. No. 15/601,959, dated Feb. 13, 2019, 7 pages.
Office Action issued for Chinese Patent Application No. 201680050535.7 dated Feb. 19, 2019, 13 pages.
Extended European Search Report for European Application No. 16815159.5, dated Feb. 20, 2019, 9 pages.
Extended European Search Report for European Application No. 16818557.7, dated Feb. 20, 2019, 9 pages.
Extended European Search Report for European Application No. 16845070.8, dated Mar. 18, 2019, 10 pages.
Extended European Search Report for European Application No. 15825399.7, dated Jul. 5, 2019, 5 pages.
Final Office Action for U.S. Appl. No. 15/617,962, dated Apr. 8, 2019, 12 pages.
Notice of Allowance for U.S. Appl. No. 15/208,545, dated Apr. 24, 2019, 9 pages.
Non-Final Office Action for U.S. Appl. No. 15/203,728, dated May 16, 2019, 10 pages.
Yingnan, L. et al. "Estimation of Basis Expansion Models for doubly selective channels", Journal of Electronics (China), Jan. 1, 2008. 25(1): 115-9.
Coleri, S. et al. "Channel estimation techniques based on pilot arrangement in OFDM systems", IEEE Transactions on Broadcasting, Sep. 2002. 48(3): 223-9.
Office Action issued for Chinese Patent Application No. 201580049201.3 dated Jun. 26, 2019, 8 pages (Translation included).
Ito, N. et al. "Pilot-Assisted Channel Estimation for OFDM Systems in Time-Varying Multipath Channels". IEEE Vehicular Technology Conference. The Proceedings of the 36th Symposium on Information Theory and Its Applications. 2013: 116-121.
Nouda, Y. et al. "A study on channel estimation for single carrier block transmission with spare pilot symbols", Collected Papers of General Conference 2012 of The Institute of Electronics, Information and Communication Engineers, 2012. 1:419.
Office Action issued for Japanese Patent Application No. 2017-503561 dated Jun. 26, 2019, 10 pages (Translation included).
Garcia-Rodriguez, A. et al. "Optimizing interference as a source of signal energy with non-linear precoding", 2014 International Wireless Communications and Mobile Computing Conference (IWCMC), IEEE: 809-814 (Aug. 4, 2014).

\* cited by examiner

SYSTEM AND METHOD FOR PROVIDING WIRELESS COMMUNICATION SERVICES USING CONFIGURABLE BROADBAND INFRASTRUCTURE SHARED AMONG MULTIPLE NETWORK OPERATORS

CROSS-REFERENCE TO RELATED APPLICATIONS

The present application claims the benefit of priority under 35 U.S.C. § 119(e) of U.S. Provisional Application No. 62/181,691, entitled SYSTEM AND METHOD FOR DEFINING AND SHARING BROADBAND VIRTUAL ANTENNA ARRAYS ACROSS MULTIPLE USERS, filed Jun. 18, 2015, which is incorporated herein by reference for all purposes.

FIELD

This disclosure relates to the field of wireless antenna towers, shared antenna systems, and telecommunications infrastructure sharing.

BACKGROUND

Modern wireless telecommunications, such as cellular telephone technology, 3G, 4G, and the like, have required substantial investment in various types of capital equipment and infrastructure. This includes cellular antenna towers, broadband cables and optical fiber, computer networks and switching equipment. In addition to technical complexity, deployment of network infrastructure also presents legal challenges and complexity since siting these towers, cables, fiber and the like requires much effort to obtain the necessary permits and real estate rights.

As a result of these high expenses, there exist appreciable financial and regulatory incentives to reduce the amount of investment required. One way of reducing such costs is to require certain kinds of resource sharing among companies (telecommunications carriers). For example, certain laws and rules in the U.S. impose upon telecommunications competitors various duties of interconnection and access to real estate rights.

Thus, different telecommunications competitors often share at least non-electronic infrastructure, such as antenna masts, at various cell sites. This is known as passive infrastructure sharing or colocation. Other antenna elements, such as physical antennas, couplers, feeder cables and the like may also be commonly shared in a passive manner.

To reduce costs further, certain organizations have taken over much of the burden of tower management, and these companies in turn lease tower space to various carriers.

Although passive infrastructure sharing and colocation reduces the burden of tower management, the process is still more complex than is desirable. For example, as of June 2015, the entity American Tower advertised a "simplified process" entitled "8 steps to get on the air fast" that illustrates various burdens on wireless carriers seeking to deploy network infrastructure. For example, such a process may include steps such as obtaining permits for equipment, uploading equipment drawings, construction permits, and the like to a third party entity, and providing purchase orders for fees, construction schedules and the like. Once the proper permissions and fees have been obtained, the entity will then typically allow the wireless carrier to install the equipment on the tower managed by the third party entity. This process generally has to be repeated for each tower, and a carrier may need thousands of towers to provide effective coverage. Of course, the alternative approach of attempting to negotiate thousands of different real estate permits with different third parties and constructing thousands of towers would be even more burdensome to wireless carriers or other network operators.

SUMMARY

Aspects of the disclosed system and method are based, at least in part, on the insight that the burden of sharing wireless infrastructure can be considerably reduced. The present disclosure describes a new type of combination remote wideband radiofrequency head system and digitally controlled reconfigurable virtual antenna array which enables different wireless carriers to nearly instantly configure shared electronic and antenna infrastructure to suit their respective needs.

This present disclosure teaches, in one aspect, a new type of software defined combination remote wideband radiofrequency head and digitally controlled reconfigurable virtual antenna array, as well as a method of managing or providing this type of arrangement. This new type of system uses a plurality of physical wideband antennas. Each of these antennas will typically be configured with wideband converters (e.g. wideband analog to digital converters, wideband digital to analog converters, or other type of converters such as digital I/Q modulators and demodulators). These various wideband converters are digitally controlled by, and can exchange data with, at least one processor and associated memory. To somewhat oversimplify, the system creates an unusually configurable, software controlled radio and software controlled antenna array system. Here "wideband" can be viewed as having a capability to handle at least 100 million samples per second (100 MSPS or higher), and indeed this may often be in the gigasamples per second (GSPS) range or higher.

The system's processor(s) are configured, usually with a software interface, to allow users (here we typically consider the "users" to be the various wireless carrier companies that are configuring the system to their needs, and the carrier's customers who in a sense also "use" the system are typically not discussed because the customers do not configure the system) to configure various combinations of software selected virtual antennas, software selected RF modulation/demodulation schemes, and software selected RF frequency ranges. For example, a 3G carrier will configure according to that carrier's assigned 3G modulation/demodulation schemes and assigned frequencies; a 4G carrier will configure according to that carrier's assigned 4G modulation/demodulation schemes and assigned frequencies, and so on. This selection will be termed a "user virtual RF configuration", and the system is designed to allow multiple different user virtual RF configurations to operate simultaneously. The user virtual RF configuration can be thought of as being a way to control the system using management plane level frames and packets.

To do this, the system processor(s) are configured to use the various user virtual RF configurations to combine and split signals from various wideband converters (such as the various analog to digital and digital to analog converters), going to and from the various physical antennas to the system's various processors, as well as how to use various software radio schemes to modulate and demodulate the wireless RF signals.

The net effect of this software controlled combination and splitting process is to distribute wireless signals that are received and/or transmitted using the various physical wideband antennas. Here however, this distribution is done according to the number of virtual antennas, RF modulation schemes, and RF frequency ranges defined by any given user according to that' user's virtual RF configuration.

The system can then further use its processor(s) and various wideband converters to wirelessly receive or transmit packets or frames of digital data according to each user's virtual RF configuration. These packets or frames of digital data can be thought of as data plane and control plane level packets and frames.

Consider, for example, what this system would do for a carrier desiring to set up an antenna tower configured according to the disclosures herein. Instead of having to do various laborious steps such as obtaining and providing equipment drawings, construction permits, and the like, and installing carrier equipment onto a given tower of interest, the disclosed system and method greatly simplifies this process. The carrier merely transmits an electronic specification of the desired user virtual RF configuration to the tower's processors. This could be simply a few packets or frames of management plane instructions. The tower's processors can then almost instantly configure the tower according to that user's specifications. Almost instantly thereafter, the carrier can then use that tower system to provide that carrier's particular type of wireless service.

After the tower is initially configured according to the desired user virtual RF configuration, the carrier can then simply transmit and receive various types of data plane and control plane packets and frames of data to and from that tower system. This tower system can then handle essentially all of the details of RF modulation and demodulation, antenna configuration, and the like. In this example, the system would allow the same cellular tower to be software configured to simultaneously handle multiple wireless carriers.

Considering now a particular aspect of the disclosure, herein is described a method of providing wireless services using configurable infrastructure including a plurality of physical antennas. The method includes receiving, from a first wireless network operator, first virtual RF configuration information. The method further includes receiving, from a second wireless network operator, second virtual RF configuration information. A first portion of the configurable infrastructure and a first set of the plurality of physical antennas may then be configured, based upon the first virtual RF configuration information, into a first virtual RF configuration including a first virtual antenna. Similarly, a second portion of the configurable infrastructure and a second set of the plurality of physical antennas may then be configured, based upon the second virtual RF configuration information, into a second virtual RF configuration including a second virtual antenna wherein at least one of the plurality of physical antennas is included in the first set and the second set. The method further includes establishing, using the first virtual RF configuration, a connection between the configurable infrastructure and a first wireless subscriber device of the first wireless network operator. In addition, a connection is established between the configurable infrastructure and a second wireless subscriber device of the second wireless network operator using the second virtual RF configuration.

The configurable infrastructure may include, in association with each of the plurality of physical antennas, at least one of an analog-to-digital converter and a digital-to-analog converter and at least one of an RF frequency upconverter and an RF frequency downconverter.

The first virtual RF configuration information may include first antenna configuration information and first air interface information, the first air interface information defining a first air interface associated with the first wireless network operator. The second virtual RF configuration information may include second antenna configuration information and second air interface information, the second air interface information defining a second air interface associated with the second wireless network operator.

The first air interface information may be associated with a first wireless communications protocol utilized by the first wireless network operator and the second air interface information may be associated with a second wireless communications protocol utilized by the second wireless network operator, the first wireless communications protocol being different from the second wireless communications protocol.

The method may further include transmitting data to the first wireless subscriber device in accordance with the first wireless communications protocol and transmitting data to the second wireless subscriber device in accordance with the second wireless communications protocol. In addition, data may be received from the first wireless subscriber device in accordance with the first wireless communications protocol and received from the second wireless subscriber device in accordance with the second wireless communications protocol.

In one implementation the configuring the first set of the plurality of physical antennas may include combining signals provided to or received from ones of the first set of the plurality of physical antennas.

The method may further include receiving, from the first wireless network operator, a plurality of virtual RF configurations wherein each of the plurality of virtual RF configurations includes information specifying one or more virtual antennas, at least one of an RF modulation and RF demodulation scheme, and at least one RF frequency range wherein the first virtual RF configuration is included within the plurality virtual RF configurations.

In another aspect the disclosure is directed to a system including configurable infrastructure for providing wireless services. The system includes a plurality of physical antennas, a corresponding plurality of wideband digital/RF converters connected to the plurality of physical antennas, at least one processor and a memory coupled to the processor. The memory includes program code which when executed by the at least one processor causes the at least one processor to receive, from a first wireless network operator, first virtual RF configuration information and to receive, from a second wireless network operator, second virtual RF configuration information. The program code further causes the at least one processor to configure, based upon the first virtual RF configuration information, one or more of the plurality of wideband digital/RF converters and a first set of the plurality of physical antennas into a first virtual RF configuration including a first virtual antenna and to configure, based upon the second virtual RF configuration information, at least one of the plurality of wideband digital/RF converters and a second set of the plurality of physical antennas into a second virtual RF configuration including a second virtual antenna wherein at least one of the plurality of physical antennas is included in the first set and the second set. The program code further causes the at least one processor to establish, using the first virtual RF configuration, a connection between the configurable infrastructure and a first wireless subscriber device of the first wireless network operator and to establish, using the second virtual RF configuration, a connection between the configurable infrastructure and a second wireless subscriber device of the second wireless network operator.

In one implementation each of the corresponding plurality of wideband digital/RF converters may include at least one of an analog-to-digital converter and a digital-to-analog converter associated with each of the plurality of physical antennas.

The memory may further include program instructions executable by the at least one processor for implementing first modulation and first demodulation operations associated with the first wireless network operator and second modulation and second demodulation operations associated with the second wireless network operator.

BRIEF DESCRIPTION OF THE DRAWINGS

For a better understanding of the nature and objects of various embodiments of the invention, reference should be made to the following detailed description taken in conjunction with the accompanying drawings, wherein.

DETAILED DESCRIPTION

Embodiments of the disclosed the disclosed configurable broadband infrastructure system may include a combination remote wideband radiofrequency head system and digitally controlled reconfigurable virtual antenna array. A simplified overview of an embodiment of the disclosed system deployed at a cellular tower (100) is shown in FIG. 1.

Figure 1:
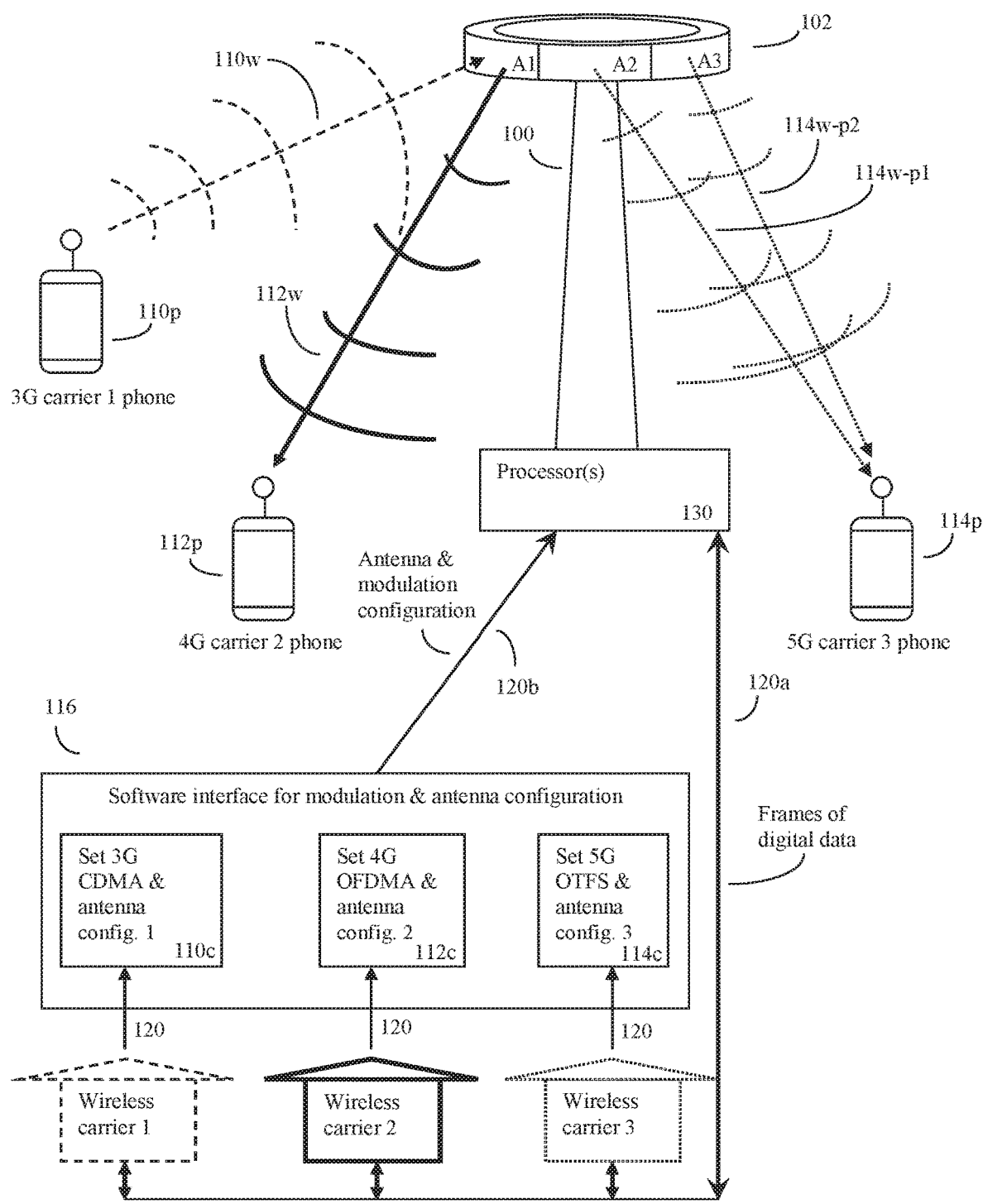
FIG. 1 shows a cellular tower embodiment of configurable broadband infrastructure including a remote software configurable wideband radiofrequency head and virtual antenna array system capable of being shared among multiple wireless carriers.

As shown in FIG. 1, the system may include a plurality of physical wideband antennas, here shown in perspective as a circular eight antenna element array (102) (only three antenna elements A1, A2, and A3, each covering a roughly 45° angle, are depicted). Typically each of these physical wideband antennas (see FIG. 2 102-A1, 102-A2, 102A-3 . . . and so on) are configured with their own, antenna specific, wideband converters (202-$c1$, 202-$c2$, 202-$c3$ and so on). These wideband converters can be high speed and wideband analog to digital (A/D) and digital to analog (D/A) converters, such as, for example, converters from the Texas Instruments TI ADC12Dxx00RF converter family or those available from Fujitsu Microelectronics America, Inc. converters, or other commercially available A/D and D/A converters. In general, wideband analog to digital and digital to analog converters configured to operate at GHz speeds in excess of 1 billion samples per second, may be used, with higher performance (greater A/D bits resolution and/or greater sampling rates) generally being preferable.

In some embodiments, the wideband converters (202-$c1$, 202-$c2$, 202-$c3$ and so on) may be other types of wideband converter devices, such I/Q modulators and demodulators, QAM modulators and demodulators, and the like. I/Q modulation and demodulation methods allow digital data to be transformed to and from waveforms suitable for wireless transmission. In the I/Q scheme, modulation is represented in an I vs Q plane where the I axis corresponds to the in-phase component of a waveform, and Q represents the quadrature component of a waveform. I/Q modulators and demodulators can be digital devices that can accept digital I and Q input data and for example output or receive RF QAM waveforms as a result, and vice versa. Alternatively, the I/Q modulators can be analog devices, but work with I and Q data that has been converted to and from analog I and Q values using suitable analog to digital or digital to analog converters. For simplicity, here we will classify I/Q modulators and demodulators as another type of wideband converter that can transform digital representation of RF waveforms from the digital domain of the system's processors, and the analog domain of the various RF wireless waveforms transmitted and received by the system's various antennas.

Examples of digital I/Q modulators include, for example, those described by Bode et. al., U.S. Pat. No. 7,680,210, and Yoon, U.S Patent Publication 20060023811, the entire contents of both of which are incorporated herein by reference. Examples of analog I/Q modulators, which may interface with suitable wideband analog to digital converters, include the Linear Technology LTC55888-1 200 MHz to 6000 MHz Quadrature Modulator with Ultrahigh OIP3, and similar types of devices.

These wideband converters will be generally controlled by, and exchange data with, at least one system processor and memory. The system processor(s) and memory will typically be configured to implement various software defined radio schemes such as, for example, the approaches disclosed by Harris, "*Digital Receivers and Transmitters Using Polyphase Filter Banks for Wireless Communications*", IEEE transactions volume 51 (4), April 2003, pages 1395-1412. Other software defined radio methods that may be employed include those described by, for example, Tan et. al., U.S. Pat. No. 8,565,811; Ting et. al., U.S. Pat. No. 7,151,925; March et. al., U.S. Pat. No. 8,050,708; and Naik et. al., U.S. Pat. No. 8,571,119, the entire contents of these patents being incorporated herein by reference. The processor(s) will often comprise various types of high performance digital signal processors and the like, as well as more standard general purpose processors (e.g. x86, ARM, MIPS other processor types) as needed. Application specific integrated circuits (ASICs) and other types of devices and methods may also be used for this type of work, and these can be viewed as being another type of processor.

Software radio methods are facilitated at least in part due to the availability of, for example, A/D converters capable of operating in a broadband mode and at very high (GHz range) speeds. For example, the Texas Instruments TI ADC12Dxx00RF family of A/D converters can sample with 12 bit resolution at frequencies of 2.7 GHz and greater, and at rates of 3.6 gigasamples per second (GSPS). As another example, Fujitsu Microelectronics America, Inc. produces a 56 GSPS 8-bit A/D converter. Various types of wideband amplifiers and timers are also available to match this capability.

As previously discussed, in some embodiments the disclosed system may be characterized as configurable broadband infrastructure including a software defined combination remote wideband radiofrequency head system and a digitally controlled reconfigurable virtual (or physical) antenna array. Here, the term "virtual" is used to denote the fact that the various users (e.g. wireless carriers) need not try to configure the various physical antennas directly. Rather, the system can present a more standard virtual antenna interface, that the wireless carriers can control, and the system can then handle the overhead of controlling the physical antennas accordingly. Of course in some schemes, carriers may be allowed to "write directly to hardware" and control the physical antennas directly. Thus the term "virtual" is not intended to be limiting in this regard, and is intended to cover situations where users (carriers), in particular higher service level users (carriers) are allowed to control the system's physical antennas directly. However since this is generally a shared system, where different users (carriers) may be simultaneously configuring the system to their particular needs, a virtual antenna system can help shield complexities and conflicts from the users. Additionally, a virtual antenna array system can help preserve confidential business information as well, so that a first carrier does not get too much insight into what a second carrier is doing.

Thus the various user (carrier) specified software defined radio schemes will allow the user to define (via a software interface), the various user desired RF modulation/demodulation schemes, desired RF frequency ranges, power levels, and the like. The system also allows users, via the software interface and the system processors, to configure various virtual (or physical) antennas from the virtual antenna array (which in turn is based on an array of physical antennas).

More specifically, in one embodiment the system comprises at least one processor configured with a software interface that allows users (wireless carriers) to configure a number of virtual antennas, RF modulation/demodulation schemes, and RF frequency ranges to use for this virtual antenna array, thereby defining at least one "user virtual RF configuration". That is the "user virtual RF configuration" will typically allow a user so specify at least a number of virtual antennas (here by specifying that user's particular desired virtual antenna array), RF modulation/demodulation schemes, and RF frequency ranges.

FIGS. 2-8 illustratively provide additional details regarding implementation of this scheme. As will be discussed, the system's processor(s) use the various "user virtual RF configurations" to determine how to combine (typically by digital signal processing using the system processors) or split the analog to digital and digital to analog signals from the various wideband converters. These wideband converters are in turn (often via various amplifiers and frequency converters) connected to the system's various physical antennas.

As a simple receiving example, signals from two physical antennas can be digitally added by using the system processor to sum (literally adding by an addition type arithmetic operation) A/D digitized signals from the two physical antennas, thus forming a simple virtual antenna array (for receiving) composed of two physical antennas.

As a simple transmitting example, a digital signal intended for transmission can be directed by the system processors to a first wideband converter coupled to a first physical antenna, as well as to a second wideband converter coupled to a second physical antenna. The output from the two converters causes the two physical antennas to form a simple, two-antenna virtual antenna array.

As is discussed in the above-identified references describing software-defined radio, the various mathematical steps performed by the processor may be considerably more complex than these simple examples. However the point is that modern high speed processors can perform the work of RF signal creation, analysis, combination, and splitting in the digital domain. As a consequence, embodiments of the present system may enable wireless carriers to nearly instantly establish virtual infrastructure configurations which address their needs while simultaneously sharing physical components of the system.

More specifically, the present scheme allows the system to distribute wireless signals that have been received or transmitted using the system's various physical wideband antennas according the number of virtual antennas, RF modulation schemes, and RF frequency ranges defined by each user's (wireless carrier's) virtual RF configuration. The net result is that the system ends up using its various processors and at least some of its various wideband converters to wirelessly receive or transmit packets or frames of digital data (usually to and from each user's customers) according to each user's virtual RF configuration.

FIG. 1 shows a diagram of configurable broadband infrastructure including a software defined combination remote wideband radiofrequency head and a digitally controlled reconfigurable virtual antenna array. In this embodiment, the system is configured on a tower (e.g. cellular tower 100) with a software reconfigurable virtual antenna array shown in perspective (102). This array (102) is in turn composed of a plurality of physical broadband antennas (102-A1, 102-A2, 102-A3) that in a preferred embodiment are selected so that each physical broadband antenna operates over at least 1 GHz of frequency bandwidth.

In this embodiment each individual physical antenna is shown as having some directionality to it (here three of eight physical antennas, each with at least 45° of coverage are shown). This directionality makes for some good graphical examples, but is not a required feature of the invention.

As can be seen in the overhead view (FIG. 2, 200) of the antenna array shown in perspective in FIG. 1 as (102), in this embodiment, the various physical antennas are arranged in a circular array so as to provide, between them a full 360 degrees of wireless coverage. Note however that this is not intended to be limiting, and there can be situations where a full 360 degrees of wireless coverage is not necessary, or where no antenna directionality at all may be used.

In FIG. 1, three different wireless carriers (users), a first 3G carrier 1 (110), a second 4G carrier 2 (112), and a third 5G carrier 3 (114) are each simultaneously using the same system to provide wireless cell phone coverage to their respective customers. The 3G carrier 1 (110) is providing coverage to a 3G carrier 1 phone (110p), the 4G carrier 2 (112) is providing coverage to a 4G carrier 2 phone (112p), and the 5G carrier 3 (114) is providing coverage to a 5G carrier 3 phone (114p). Of course typically each carrier will be serving multiple customers per tower.

In this example, each carrier is using its own modulation scheme, frequency range, and potentially also its own power levels, and each carrier may also have its various wireless customers disposed in different locations relative to the tower (100). For example, carrier 1 (110) may have more customers located to the left (such as 110p), carrier 2 (112) may have more customers located in the middle (such as 112p), and carrier 3 (114) may have more customers located to the right (such as 114p). Thus each carrier may need to have more antennas allocated to different regions. To manage this, each carrier uses the system's software interface (116) to configure the system according to that particular carrier's needs (see FIG. 8 for a more detailed discussion of this software interface).

Here for example, the carriers are each specifying their particular RF modulation scheme and virtual antenna type. The system can in turn analyze the choice of virtual antennas, and determine, for example, which converters tied to which physical antennas to use to achieve the desired result.

Thus if 3G wireless carrier 1 (110) is specifying a particular 3G CDMA modulation scheme, and antenna configuration favoring the direction of its customer (110p) via software interface (116) and commands (110c), then the system might automatically determine that physical antenna 102-A1 is best suited for this purpose, and use the converter (110c) to send and receive signals via antenna 102-A1 and RF waveforms (110w).

If 4G wireless carrier 2 (112) is specifying its particular 4G OFDMA modulation scheme and antenna configuration favoring the direction of its customer (112p) via software interface (116) and commands (112c), then the system might determine that physical antenna 102-A1 is also best suited for this purpose, and use the converter (112c) to simultaneously send and receive signals via antenna 102-A1 and RF waveforms (112w). Wireless carrier 1 (110) and 2 (112) can otherwise proceed as if they had the system to themselves.

If 5G wireless carrier 3 (114) is specifying its particular 5G modulation scheme and antenna configuration favoring the direction of its customer (114p) via software interface (116) and commands (114c), then the system might automatically determine that it should create a virtual antenna by combining physical antennas 102-A3 and 102-A3, and possibly use phase adjust techniques (via RF waveforms 114w-p1 and 114w-p2) to provide better coverage. Here, (assuming that carrier 3 (114) doesn't elect to "write to hardware") the system can keep track of these details automatically as well, and again carrier 3 simply interacts with a virtual antenna).

Figure 8:
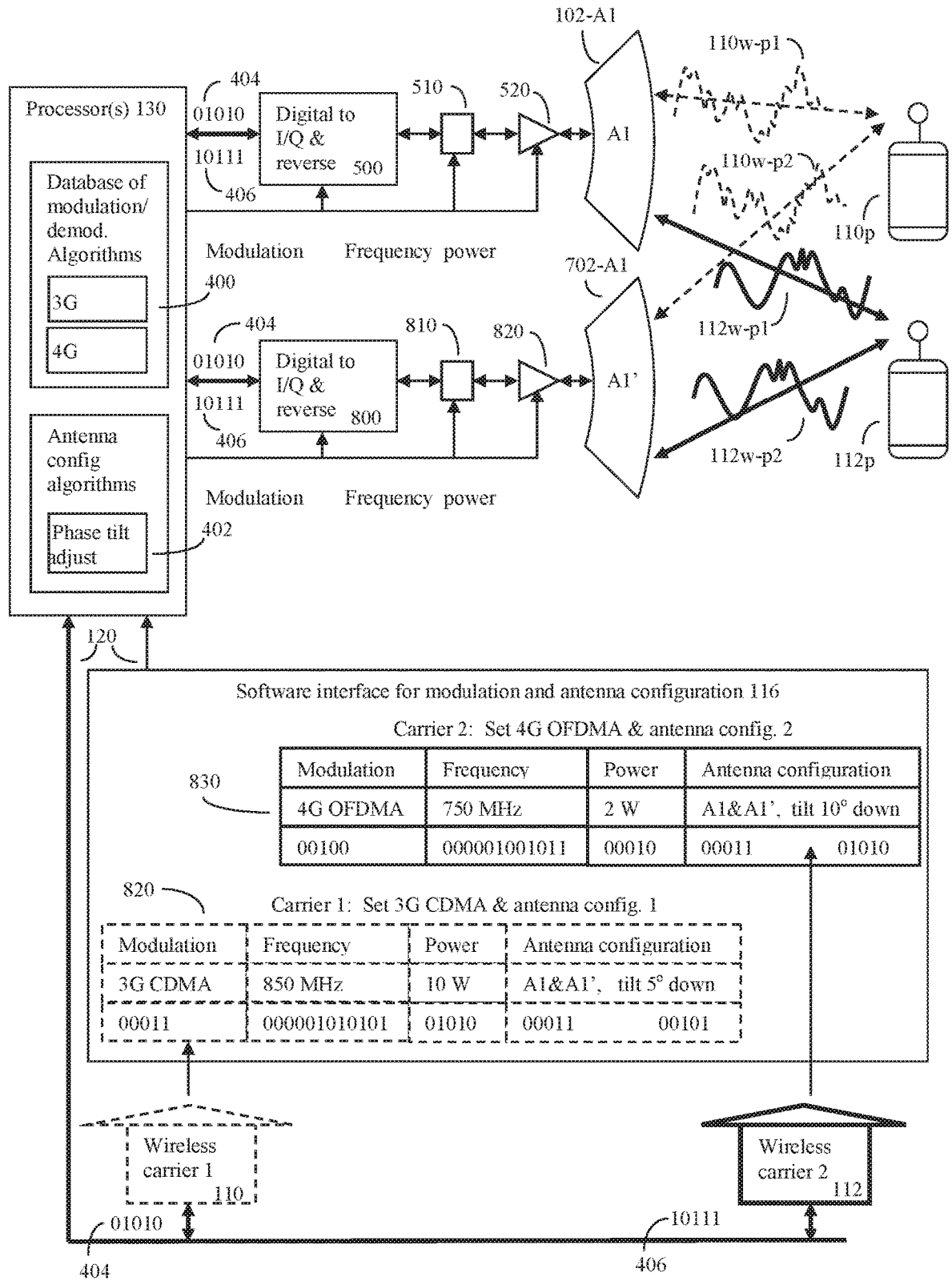
FIG. 8 illustrates exemplary details of information captured and displayed by a user interface of the configurable broadband infrastructure system.

FIG. 8 shows a more detailed example one embodiment of the system software interface (116). In some embodiments, the various users (carriers) can simply transmit to the system processor (130), one or more digital data packets or frames, formatted according to the system's software interface specifications, that contain that particular carrier's requested user virtual RF configuration and other desired RF properties. Here, the various users (carriers) can send and receive information in digital format (e.g. send and receive data plane and control plane packets and frames, as well as send and receive virtual RF configurations various management plane packets and frames) from the tower (110) and the rest of the system using any suitable telecommunications data channel (120a, 120b), including optical fiber, cable, or other type of wireless communication as desired.

Here, the use of router-like terminology, such as data plane, control plane, and management plane packets and frames, although not entirely precise, does communicate the spirit of an embodiment of the disclosed system. That is, the carrier's customer communications over the system will typically be handled by data plane and control plane packets and (120a) between the system and the various wireless carriers (110, 112, 114). By contrast, the information that the carriers use to configure the system can be viewed as management plane data packets or frames (120b) between the various wireless carriers and the system. Often, of course, all such communications between the various carriers (uses) and the system will generally travel over the same suitable telecommunications channel (120 in the other figures). Thus, since (120a) and (120b) generally refer to the same telecommunications channel(s) between the carriers and the system, here we will generally just refer to this channel(s) as (120).

After configuring the system, the various carriers (110, 112, 114) can then communicate with their various customers (110p, 112p, 114p) by transmitting and receiving various digital data packets or frames over communications channel (120). In some embodiments, the system can then use stored information regarding the various RF modulation schemes and antenna configuration schemes, as well as the various user virtual RF configurations, to automatically (if desired) implement various software radio schemes and antenna sharing schemes in a manner that can be relatively transparent to the various carriers (users).

Note that because the system is handing all or nearly all of the overhead in transforming digital data to and from various RF waveforms, the amount of data that needs to be transmitted over communications channel (120) is considerably reduced (relative to the alternative).

Consider QAM waveforms, such as QAM-64 as an example, which can digitally transmit 6 bits of data per QAM constellation. If the carriers had to transmit a full description of a QAM-64 waveform to the system by using a brute force, Nyquist-sampled, digitized version of the QAM-64 waveform, then a much large amount of data would need to be sent over channel (120) to the system. However, embodiments of the system require that only the underlying data transmitted by the RF waveforms needs to be specified and transmitted. Thus, neglecting overhead, only 6 bits of data need be sent over communications channel (120) in this case.

More specifically, once the system understands the various wireless virtual RF configurations, the system can then take care some or all of the details of antenna configuration and modulating and demodulating the digital data according to that particular carrier's chosen scheme. Note that often, the system's virtual antenna scheme can result in the same physical antenna handing communications for multiple different carriers and modulation schemes at the same time. This is possible because the system's processor(s) can first digitally compute multiple modulation schemes from multiple carriers, sum them (as one example), and then send the combined signals to the same antenna at the same time as needed. Similarly, the system(s) processors can receive digitized signals from the same antennas containing multiple modulated waveforms from multiple carriers, use standard digital signal analysis methods to separate the various multiple waveforms, and then send the underlying information from the waveforms back to the various carriers.

This process is also shown in FIG. 1. In this figure, note that carriers (110) and (112) are using two different RF modulation schemes (3G and 4G) and the same physical antenna (102-A1) to simultaneously communicate with their respective customers (110p) and (112p) using wireless waveforms 110w and 112w.

By contrast, carrier (114) is using a different antenna scheme, in which it is using two physical antennas (102-A2 and 102-A3) as a single phase adjusted virtual antenna to communicate with its customer (114p) using a 5G modulation scheme with some phase adjustments between antennas (102-A2) and 102(A3) to produce wireless beams (114w-p1) and (114w-p2) with somewhat improved directionality. In a preferred embodiment, the system may automatically handle the overhead of determining what combination of various physical antenna directionality and various wireless waveform phase adjustments to use to produce good signal response, and minimize any conflicts between different carriers.

Because the system is handling most of the details of RF modulation/demodulation and antenna configuration, this process can be made almost entirely transparent to the carriers (users) as desired. Thus, the system and method allow the various users (carriers) to configure a number of virtual antennas by using their respective user virtual RF configurations, and the system processor(s) to select which of the various physical antenna specific wideband converters to electronically (e.g. computationally) combine (or split) to form various types of virtual antennas.

Figure 2:
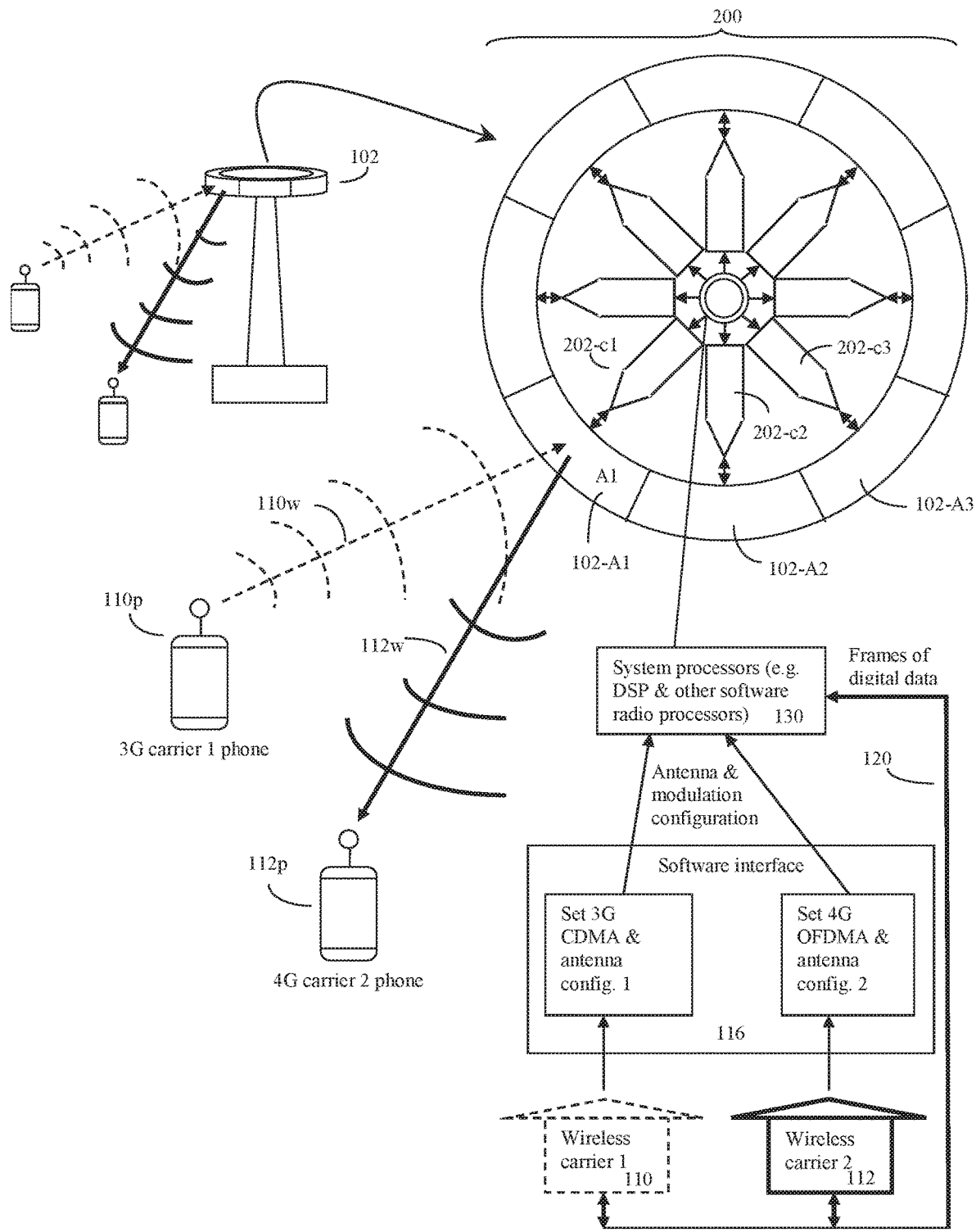
FIG. 2 shows more detail of the physical aspects of the configurable broadband infrastructure system capable of being shared among multiple wireless carriers.

FIG. 2 shows more detail of the physical aspects of the invention's software reconfigurable virtual antenna array. Here the circular antenna array (102), previously shown in FIG. 1 in perspective and mounted on the tower (100), is now shown in a magnified top down view (200).

The various physical antennas (102-A1, 102-A2, 102-A3 . . . ) as previously discussed receive and transmit RF signals as a series of modulated waveforms. To keep the system flexible and compatible with a wide range of different and commonly used wireless standards, in a preferred embodiment, the various physical antennas will be wideband antennas are configured for operation over at least 1 GHz of bandwidth. Additionally, in a preferred embodiment, these physical antennas will also be configured for operation over any base frequency between 600 MHz and 6 GHz. Alternatively multiple antenna types, each tuned for a narrower range of bandwidth or frequencies may be used. If less flexibility is desired, the bandwidth and/or frequency range of the various physical antennas may also be reduced.

As previously discussed, although these various wireless waveforms transmit digital data, the wireless waveforms themselves can be best understood as being analog signals. By contrast, the disclosed embodiments permit wireless carriers to interact with the system by exchanging packets or frames of digital data. Again, as previously discussed, most or all of the computational overhead of the system is also done digitally, for example using various types of digital signal processors (130). Although it is convenient to do most of the computational work of the system in the digital realm, at some point the system must transmit and receive continually varying (essentially analog) wireless waveforms.

The interface between the digital portion of the system (130) and the various analog type wireless waveforms received and transmitted by the various antenna can be exemplified by various types of wideband converters such as an array of wideband analog to digital (ADC) or digital to analog (DAC) converters. These are shown in FIG. 2 as converters (202-c1), (202-c2), (202-c3), and so on. Here assume each converter (e.g. 202-c1) actually represents a converter set or dual function converter that can operate in both directions for both receiving and transmitting. Generally, the term "converter" here is intended to indicate a bidirectional converter. However since this is cumbersome to draw; only single directional converters will be shown.

Note that each converter (converter set, bidirectional converter) is shown here connected to its own unique physical antenna. This is the most flexible arrangement as it allows the various system processors to create various types of virtual antennas by computational calculations that combine or separate signals from the different physical antennas via these converters. However as will be discussed, in some configurations the system processors can alternatively define some virtual antenna arrays by more direct electrical connections that may connect the same converters to multiple physical antennas.

Thus, for example, in the arrangement shown in FIG. 2, physical antenna 102-A1 is connected to converter(s) 202-c1, which in turn are connected to the system processors (130). The system processors (130) are simultaneously handling the task of receiving wireless signals (110w) from carrier 1's customer (110p) and also transmitting wireless signals (112w) to carrier 2's customer (112w).

In some shared antenna cases, there is a possibility that cross talk can occur when different users (carriers) attempt to use the same physical antenna for transmitting and receiving at the same time. To reduce this issue, various types of STAR (simultaneous transmit and receive) methods, such as those described in Fenn, U.S. Pat. No. 8,749,441, the contents of which are incorporated herein by reference, or other STAR methods, such as the methods Cox et. al., "Maximizing RF Spectrum Utilization with Simultaneous Transmit and Receive" Microwave Journal, September 2014, Vol. 57 Issue 9, p 114-126 may optionally be used.

Figure 7:
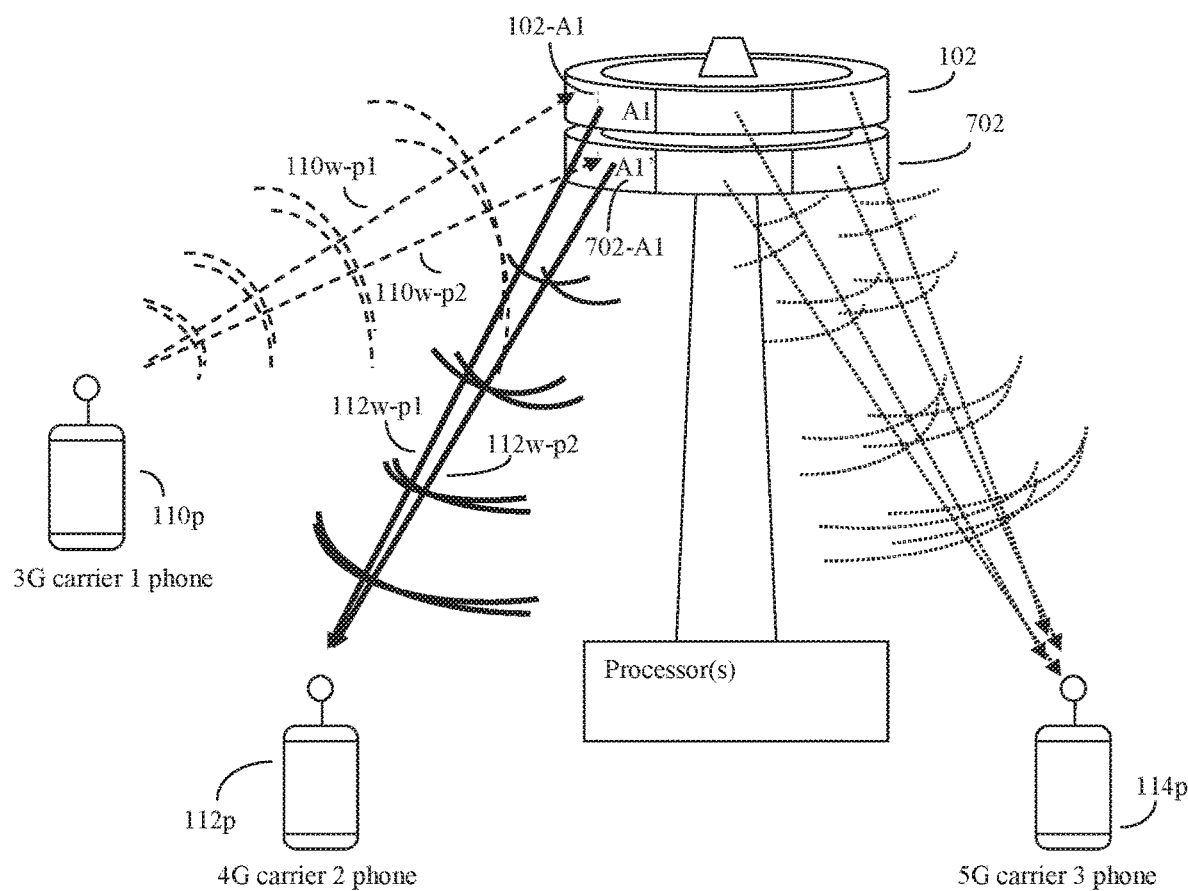
FIG. 7 shows an alternative version of a cellular tower configured with a stacked antenna array configuration in accordance with the present disclosure.

Alternatively, cross-talk problems can be reduced by using a configuration where each physical antenna is reserved for only transmitting or only receiving. In this case, the transmit antenna and receive antennas may be separate antennas oriented in the same direction, and also controlled by the system processors, such as shown in FIG. 7.

In either situation, the system processors (130) will typically be configured to attempt to minimize interference between the various carriers and RF modulation schemes, and/or to transmit warning messages to the carriers when some interference is unavoidable. Here, in the event of conflicts, carriers may select various quality of service levels as to which carrier will automatically be given priority in such a situation.

Referring again to FIG. 2, physical antenna 102-A1 is simultaneously communicating with mobile phones (110p) and (112p) carried by customers of two different wireless carriers (110) and (112), each using a different frequency range and modulation scheme.

Figure 3:
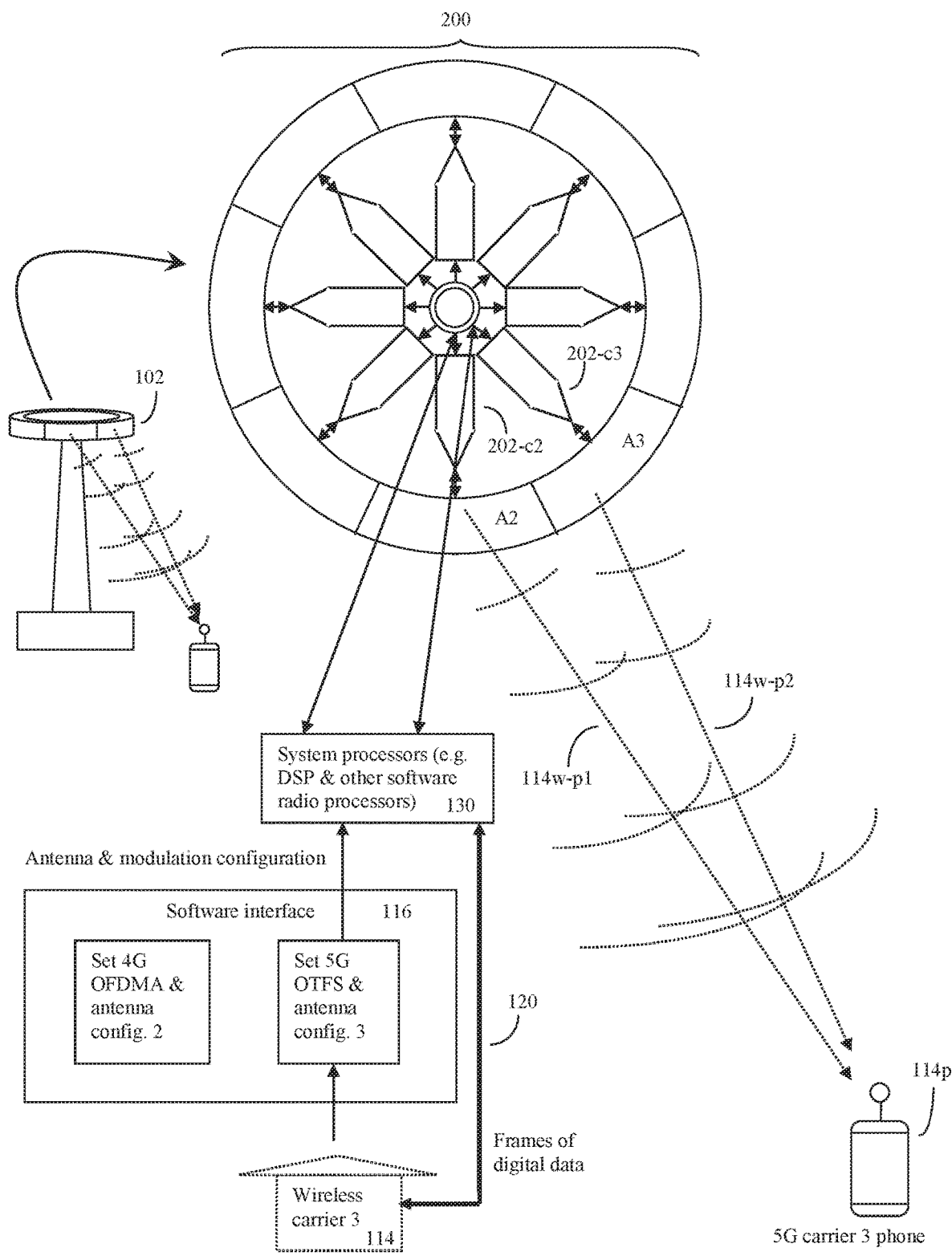
FIG. 3 shows another example of the configurable broadband infrastructure system in operation.

Turning now to FIG. 3, a description is provided of exemplary operation of a reconfigurable virtual antenna array in accordance with the present disclosure. In this embodiment, the various different physical antennas, although having some directionality, may also be configured so as to at least partially overlap with the directionality of other physical antennas, such as adjacent physical antennas.

In this embodiment, the system is also configured to, either automatically, or alternatively under carrier control (such as through the software interface), adjust the relative phases of the waveforms emitted by the various antennas to further direct wireless energy towards desired locations. In the example of FIG. 3, the system has automatically determined that the 5G carrier 3 phone (114p) is located in a location that is in between physical antenna 202-A2 and 202-A3. To achieve better results, the system processors (at least upon proper carrier authorization through the software interface) and converters (202-c2 and 202-c3) can automatically adjust the phases of the RF waveforms (114w-p1 and 114w-p2) emitted or received by antennas 202-A2 and 202-A3 so as to better direct the wireless beam(s) to the location of (114p).

Put alternatively, in some embodiments, the software interface and the user virtual RF configuration can be configured to allow users (or the system itself, automatically) to further configure a directionality of the various virtual antennas. This allows either the users or the system or both to define various types of directional virtual antennas. This can be done by either choosing physical antennas with suitable directionality, varying the phases of the wireless waveforms transmitted or received by the various antennas, or a combination of these two approaches.

In some embodiments, the system processor(s) and converters can be configured to allow the various users (wireless carriers) to configure their desired RF modulation/demodulation schemes using the previously discussed I/Q methods and devices. For example, the user virtual RF configuration can be used to further define at least one I/Q RF modulation/demodulation scheme. In this situation, at least some of the various wideband converters used to RF modulate or demodulate the packets or frames of digital data between RF waveforms and digital data may also be I/Q RF modulators and demodulators.

For example, in some I/Q embodiments, the system processor may allow the users (e.g. wireless carriers) to configure their various RF modulation/demodulation schemes by using at least some of the various I/Q type wideband converters to RF modulate or demodulate the frames of digital data between RF waveforms and digital data by using their user virtual RF configurations to further define at least one I/Q RF modulation/demodulation scheme.

In some cases, use of such I/Q RF modulation and demodulation schemes can be advantageous because it can help reduce the computational demands on the system processor(s). For example, with I/Q schemes, the processor can use the user virtual RF configurations to further configure the directionality of the various virtual antennas by adjusting the phases of the relevant wireless waveforms according to various I/Q RF modulation/demodulation schemes. Such phase adjustments can, of course, be done using other methods, including even digital signal processing based on brute force type Nyquist-sampling type methods, but of course schemes that result in lower processor loads and requirements are typically desirable.

Note that as will be discussed later in FIG. 6, the system can adjust the directionality of the various virtual antennas by various methods. The system can adjust the relative phases of various (directional or non-directional) physical antennas by software selecting appropriate antennas, and using suitable digital signal processing techniques such as phase adjust techniques. The system can also control the directionality of the various physical antennas by selecting physical antennas with the desired direction, and combining or splitting them via direct electrical connections and suitable software controlled switches.

Figure 4:
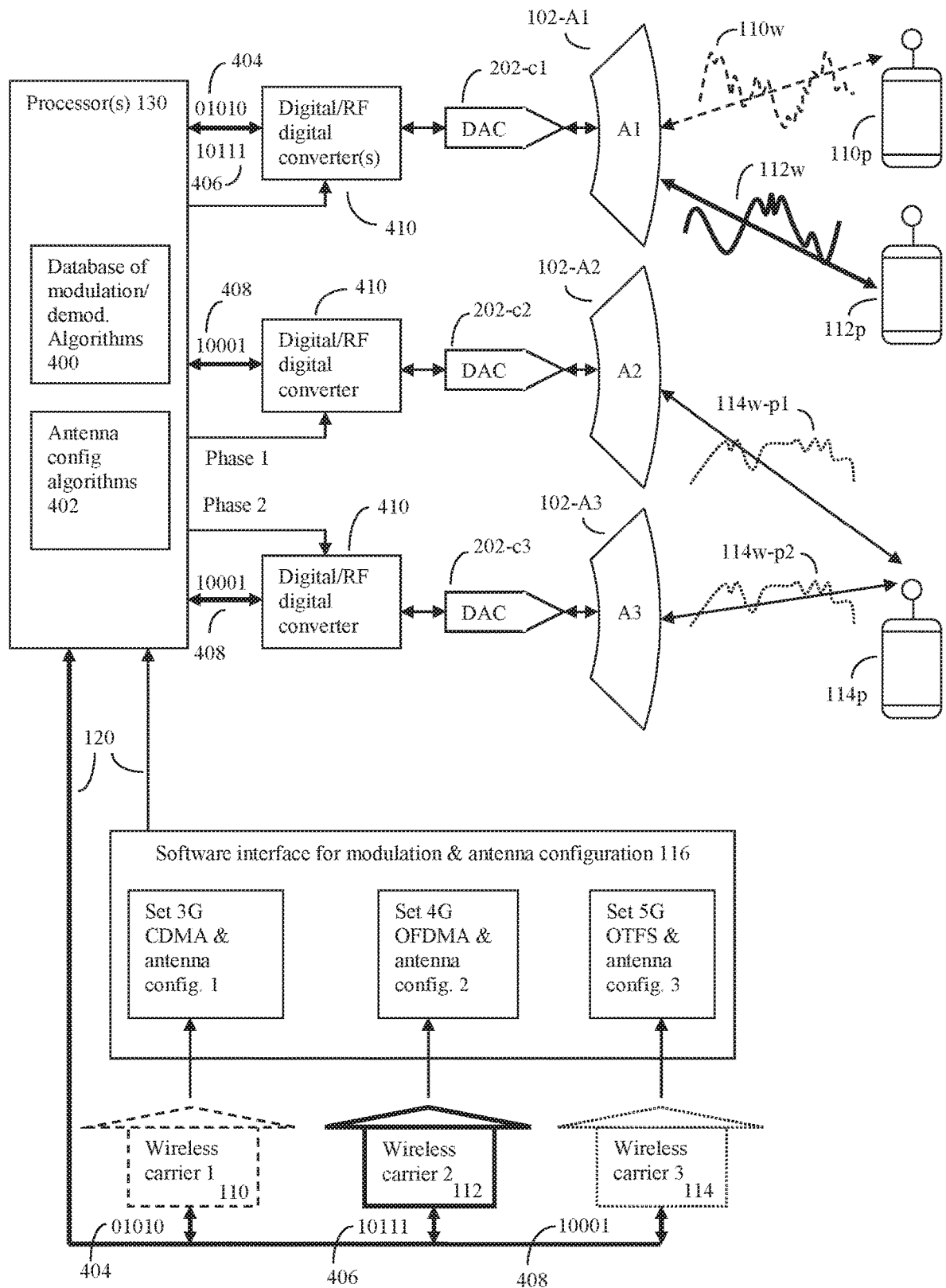
FIG. 4 illustrates details of a manner in which the configurable broadband infrastructure system can simultaneously manage three of its various physical antennas according to the scheme previously discussed in FIG. 1.

FIG. 4 shows more details of how the system can simultaneously manage three of its various physical antennas according to the schemes previously discussed in FIGS. 1-3. In this embodiment, the various carriers (110, 112, and 114) use the software interface (116) to inform the system processor(s) (130) about the various carriers' preferences with regards to RF modulation/demodulation methods and antenna configuration.

In this embodiment the system processor(s) (130) can use their database of modulation and demodulation algorithms (400) and antenna configuration algorithms (402) and the input digital data packets or frames from the carriers (via 120), symbolized by digital signals (404, 406, and 408) to digitally convert the various transmitted digital data packets or frames (404, 406, 408) to digital RF output (e.g. digital RF waveforms in I/Q format, or digitized RF waveforms), as shown in (410). In this example the digital RF output is being converted to analog RF signals using various broadband Digital to Analog Converters (DAC)) or else is doing the reverse operation using various broadband Analog to Digital Converters (ADC). As previously discussed, other types of converters, such as I/Q converters, may also be used.

More specifically, in FIG. 4, the system processor (130) can automatically use information previously obtained on the location of the various mobile phones (110p, 112p, and 114p), its database of modulation and demodulation algorithms (400), its database of antenna configuration algorithms (402), and various digital converters (such as 202-c1, 202-c2, 202-c3) to simultaneously modulate the RF waveforms for the 3G carrier 1 phone (110p) and 4G carrier 2 phone (112p) in accordance with 3G and 4G modulation protocols, respectively.

The system can then use the previously discussed Digital to Analog converters or other type of converters to simultaneously transmit both waveforms using physical antenna (102-A1). As previously discussed with reference to FIG. 3, the system can also use its antenna configuration algorithms (402) to adjust the phases of the input or output RF signals over antennas (102-A2) and (102-A3) so as to steer the beam directions (114w-p1 and 114w-p2) towards the desired destination, which in this case is the location of 5G carrier 5 phone (114p).

Depending on the system configuration, and in particular on the various antenna configuration algorithms (402) used, the process of antenna selection and management may be done automatically by the system, or alternatively relevant information and parameters may be passed to the various carriers over the software interface (116), and the various carriers may play a more active role in antenna management as desired.

Often, to further reduce processor computational overhead, it may be useful to equip the system with various RF frequency up/down converters (see FIG. 5 510, 512, 514) connected between the physical antennas and the corresponding physical antenna specific wideband converters. In these embodiments, the system processor(s) may allow the various users (wireless carriers) to configure which RF frequency range(s) they want to use by, for example, also allowing the carriers (users) to select, via the user virtual RF configuration, the various conversion frequencies of these RF frequency up/down converters. This allows the system processor(s), for example, to compute the various waveforms at a lower frequency (generally computationally less intensive), and then upconvert (or down convert) to and from higher frequencies by suitably configured RF frequency up and down converters.

The database of modulation and demodulation algorithms (400) that encodes for various RF modulation/demodulation and signal encoding/decoding schemes can include any schemes or standards including, for example, GSM, IS-95, TDMA, FDMA, OFDM, CDMA, WCDMA, OTFS and QAM.

In some embodiments, such as the previously discussed I/Q embodiments, at least some of the wideband converters can be configured to RF modulate or demodulate the frames of digital data between RF waveforms and digital data by using the user (wireless carrier's) virtual RF configuration to further define at least one I/Q RF modulation/demodulation scheme. As before, this at least one I/Q RF modulation/demodulation scheme can include any known RF modulation/demodulation and signal encoding/decoding scheme.

Figure 5:
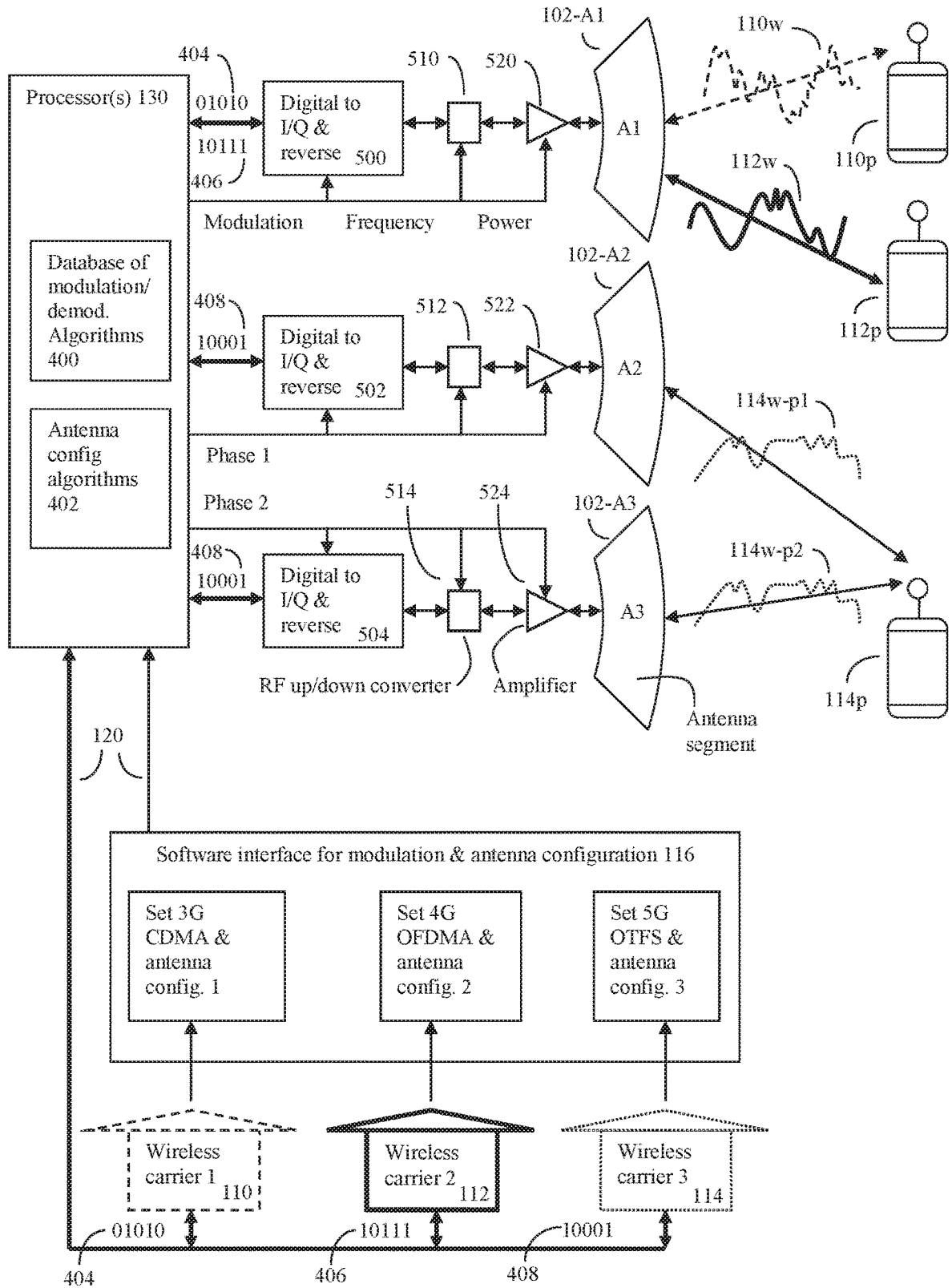
FIG. 5 shows an alternative embodiment of the configurable broadband infrastructure system.

FIG. 5 shows an alternative embodiment of a configurable broadband infrastructure system in accordance with the disclosure. Except as otherwise provided below, the embodiment of FIG. 5 may operate similarly to the embodiment of FIG. 4. In the embodiment of FIG. 5, the process of transforming the digital data frames (404), (406), (408) to and from RF waveforms is done using wideband digital/RF converters including several different devices. Here for example, the processor(s) (130) can use a database of modulation and demodulation algorithms (400) to convert the data to and from an I/Q modulation type coordinate system, and this digital IQ data in turn can be provided to, or received from, a digital I/Q modulator or demodulator device (500, 502, 504). In the case of RF signal transmission, this process will produce a base RF signal modulated according to carrier choice, which also carries the data from and to the various digital data frames.

This base RF signal can in turn be sent to RF frequency up converters (or down converters) (510, 512, 514) that in turn transpose the RF signal to and from the desired frequency range. This RF input or output in turn can be sent (or received from to an RF amplifier (520, 522, 524) and the amplified RF signal can then be sent to the appropriate antenna(s). The process essentially operates in reverse to receive RF signals from the various remote wireless devices (e.g. various customer mobile phones). These RF signals are again represented by (110w), (112w), (114w-p1), and (114w-p2). Note that each physical antenna may be connected to multiple frequency converters and amplifiers, and even multiple converters, as desired, in order to accommodate the differing needs of multiple users (carriers).

Although, the process of combining or splitting different physical antennas to produce various types of virtual antenna arrays, either automatically or in accordance with instructions received from wireless carriers, has been discussed in terms of a mathematical process taking place at the system processor(s) (130), alternative approaches are within the scope of the disclosure and are not disclaimed.

For example, in some embodiments, either as an alternative to, or in addition to, such mathematical combination and splitting schemes, virtual antenna arrays may also be created by various types of processor (130) and software (402) controlled electronic switches that directly electrically connect, or disconnect, various physical antennas from each other. In this alternative embodiment, the software interface and the user virtual RF configuration can be such as to allow the system to, for example, further electronically combine or connect (typically by software controlled switches) or by direct electrical connection a plurality of physical antennas to create one or more virtual antennas with desired properties. In such embodiments the directionality of the virtual antennas (thereby defining directional virtual antennas) may be configured by using software controlled switches to directly electrically combine or connect physical antennas with the desired directional properties. Other virtual antenna characteristics, such as sensitivity, bandwidth, frequency range, and the like can also be created by appropriate combination of various physical antennas according to a software controlled, direct electrical connection, type switching scheme.

Figure 6:
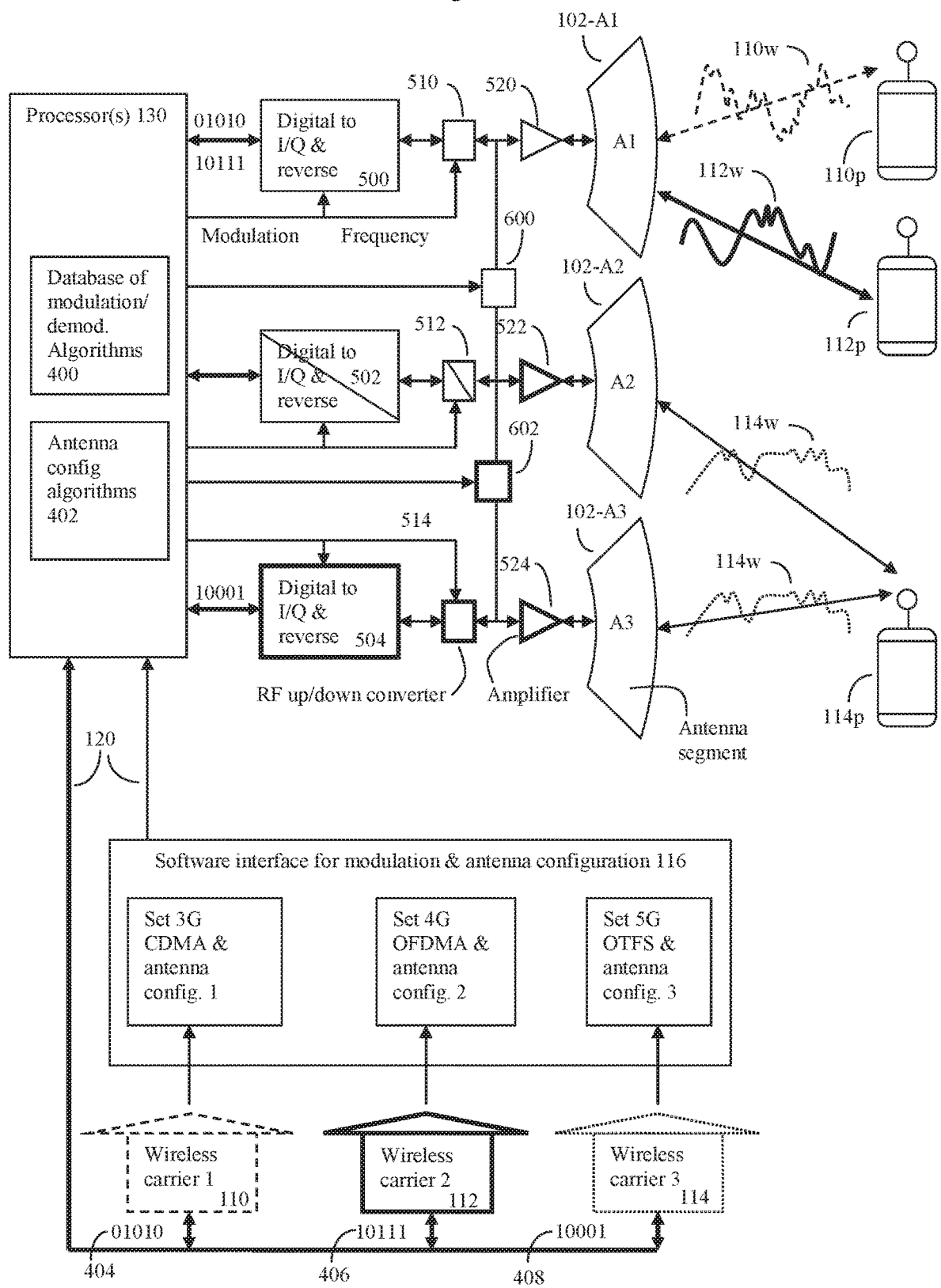
FIG. 6 shows an alternative embodiment illustrating one manner in which selected physical antennas of the configurable broadband infrastructure system may be electrically combined to produce a larger virtual antenna.

Thus, for example, as is illustrated in FIG. 6, at least some of the various physical wideband antennas can be directional physical wideband antennas. Here the system processor(s) can, for example, allow the users (wireless carriers) to configure the directionality of various virtual antennas by using the virtual RF configuration to select and directly electrically combine suitable physical antennas. In this example, this direct electrical combination is done according to the directionality of said directional physical wideband antennas, but again other characteristics, such as antenna bandwidth, frequency range, gain, etc. can also be used.

Put alternatively, user virtual RF configuration, as input to the system via the system software interface, can allow the system users to further configure the RF characteristics of the virtual antennas, thereby defining customized virtual antennas. Here to be useful, often at least some of the physical wideband antennas may have different antenna characteristics or properties (e.g. different directionality, sensitivity/gain, bandwidth, frequency range, polarization, and the like). This antenna configuration will typically be done computationally (e.g. using digital signal processing methods) by the system processor(s), but can also be aided, as needed, by the processor directed formation (usually using software controlled switches such as (600, and 602) of direct electronic connections between the various physical antennas as needed.

FIG. 6, which is largely based on FIG. 5, shows an alternative embodiment showing how the system can electronically, and under processor control, switch, combine or gang select two different physical antennas (102-A2) and (102-A3) to produce a larger virtual antenna by direct electrical connections.

In this embodiment, either before or after an RF amplification stage (520, 522, 524) (here before is shown), various physical antennas may be electrically directly connected to form a larger virtual antenna using commands from processor (130) and software (402) controlled switches (600, 602).

As one example, if a particular wireless carrier, such as carrier 3 (114), desires to configure the system for wider angle and more sensitive virtual antennas, carrier 3 (114) can use the software interface to request that the system engage switch (602) to electrically connect physical antennas (102-A2) and (102-A3) to create a larger virtual antenna that covers (in this example) a wider range of angles.

Again referring to FIG. 6, engaging software controlled switch (602) causes antennas (102-A2) and (102-A3) to become effectively electrically connected. This renders the two wideband digital/RF converters comprised of digital I/Q modulator or demodulator device (502, 504) and frequency RF frequency up converter (or down converter) (512, 514) mutually redundant, since only one such digital/RF converter (i.e., first converter 502/512 or second converter 504/514) is needed to handle both physical antennas. As a consequence of this connection, both antennas emit (or detect) RF waveforms (114w) at the same phase.

Accordingly, the embodiment of FIG. 6 suggests that although different wireless carriers may use the software interface to electrically combine physical antennas, it may further be useful to allow the system processor to also have at least some control over which antenna combinations are allowed, since the requirements of different carriers may conflict. Despite these potential drawbacks, there may exist circumstances where allowing carriers to cause such direct electrical connection of physical antennas may be useful. Such conflicts could be potentially resolved by according different wireless carriers different quality of service levels, where the preferences of wireless carriers with higher quality of service levels would be given priority over those having lower quality of service levels.

In order to reduce cross-talk it may be useful to employ different but similarly oriented antennas for receiving and transmitting wireless RF waveforms. Alternatively, in some embodiments, it may also be useful to be able to also have control over the angle of elevation of the various wireless RF waveforms received and transmitted by the system. Here, some alternatives to the antenna arrangement previously shown in FIGS. 1-6, as shown in FIG. 7 may also be useful.

FIG. 7 shows an alternative embodiment with an alternative antenna arrangement. Here the various antennas may also be configured in a stacked arrangement, with multiple physical broadband antennas (exemplified by multiple physical antennas in a first circular array 102 and multiple physical antennas in a second circular array 702) are generally configured to point in the same direction.

Such a stacking arrangement can be used for multiple purposes. In some embodiments, multiple physical antennas (102) may be used to receive wireless RF signals, while multiple physical antennas (702) may be used to transmit wireless RF signals, thus reducing cross-talk between the transmitting and receiving antennas.

Alternatively, and as shown in FIG. 7, this stacked antenna arrangement may be used to allow the system to phase adjust the signals received or transmitted by the stacked antennas to better adjust the elevation (e.g. angle relative to the horizon) of the wireless RF beams. Here, for example, wireless devices close to the base of the tower can be better distinguished over wireless devices further away from the base of the tower because the elevation of the wireless beams will be different.

Alternatively, the signals from the stacked antennas can be electrically (rather than computationally) combined as well, as per the example previously shown in FIG. 6.

In one embodiment the software interface between the configurable broadband infrastructure system and the wireless carriers can be as simple as a scheme in which the processor(s) (130) implement a management plane type convention by which the various wireless carriers can use their computerized control devices to send and receive (typically via connection 120) digital packets or frames (e.g. management plane packets or frames) of information to manage the system. In this regard, the "software interface" can be as little as giving the system processor(s) (130) an ability to parse digital packets or frames (e.g. management plane packets or frames), received from the various users (wireless carriers) and to use the results of this parsing operation to configure the system accordingly.

The "software interface" can also be used by the system processor(s) to transmit management plane information to the various wireless carriers (carried again by various packets or frames) acknowledging previous commands, informing about the status of the system, and the like. The software interface may include a human readable graphical user interface, such as that presented by a Web page, configured to allow human users having devices equipped with suitable Web browsers to configure the system.

In this embodiment, the system's processor(s) (130) are configured to present a software interface to the various users (wireless carriers) that allows these carriers to each configure, on a user (carrier) specific basis, various types of user (carrier) specific number of virtual antennas, RF modulation/demodulation schemes, and RF frequency ranges—as before, each such scheme may be termed a user or carrier specific virtual RF configuration.

The system's processor(s) (130) can then use these various user or carrier specific virtual RF configurations to determine how to combine (again usually mathematically in the processor, but occasionally also by directly electrically connecting various antennas via software controlled electrical switches) the various analog to digital and digital to analog signals from the various wideband converters.

The system processor(s) can also use the various user (carrier) specific virtual RF configurations to determine, according to the number of virtual antennas, RF modulation schemes, and RF frequency ranges defined by the various user specific virtual RF configurations, as to how the system should distribute wireless signals received or transmitted using the various physical wideband antennas. The system processor can then use at least some of the wideband converters to wirelessly receive or transmit, on a user (carrier) specific basis, frames of digital data according to each user's (carrier's) specific virtual RF configuration.

FIG. 8 shows more details of how, in some embodiments, the software interface (116) can operate. Here assume that the 3G carrier 1 (110), and 4G carrier 2 (112), wish to control the system at a more detailed level (such "writing to hardware"). The carriers specify the RF wireless modulation scheme (e.g. 3G, 4G, 5G), as well as the RF frequency, wireless transmitter power, and also antenna elevation angle. For clarity of presentation, it may be assumed that the system antennas are configured in a stacked arrangement as previously shown in FIG. 7, and also that the locations of the 3G wireless device 1 (110p) and 4G wireless device 2 (112p) are also as previously shown in FIG. 7.

In this scheme, carrier 1 (110) can transmit configuration information to the software interface (116) specifying (in digital form) (820) that carrier 1 wishes configure the system to communicate with devices such as device 1 using (i) a 3G CDMA modulation scheme at the 850 MHz frequency, (ii) 10 Watts of transmitter power, and (iii) antennas 102-A1 and 702-A1 configured (though suitable phase adjustment) to tilt the wireless beam down at a 5 degree angle.

Here carrier 1's user specific virtual RF configuration can be transmitted with a management plane type configuration packet or frame such as "000110000010101010100001100101", and the system's processor(s) (130) can parse this configuration packet or frame and set the system accordingly.

Similarly, carrier 2 (112), can transmit configuration information to the software interface (116) specifying (in digital form) (830) that carrier 2 wishes to configure the system to communicate to devices such as device 2 using (i) a 4G OFDMA modulation scheme at 750 MHz using (ii) 2 Watts of power, and (iii) the same antennas 102-A1 and 702-A1 configured (through suitable phase adjustment) to tit the wireless beam down at a 10 degree angle. Here carrier 2's user specific virtual RF configuration can be transmitted with a management plane type configuration packet or frame such as "001000000100101100101010", and the system's processors (130) can again parse this configuration packet or frame and set the system accordingly.

In some embodiments, carriers may transmit various types of standing orders to the system specifying standard antenna configurations that the carrier authorizes the system to use under different scenarios. As previously discussed, the system may also offer different degrees of service, under which in the event of conflict between carrier needs (e.g. carriers wish to operate the system simultaneously in a configuration that favors one carrier at the expense of another), some carriers preferences (i.e. the carrier's preferred antenna configuration) may be prioritized over the preferences of other carriers.

Accordingly, in one embodiment disclosed herein is a method of operating a combination remote wideband radiofrequency head and digitally controlled reconfigurable virtual antenna array. The method includes configuring a plurality of physical wideband antennas to be electrically connected to a corresponding plurality of wideband converters. Each wideband converter may include a wideband analog to digital and digital to analog converter and be controlled by, and exchange data with, at least one processor and memory. The method further includes using the at least one processor to provide a software interface to enable configuration of a number of virtual antennas, RF modulation/demodulation and/or encoding schemes, and RF frequency ranges, thereby defining at least one user virtual RF configuration. The processor may combine signals from the wideband converters and distribute wireless signals received or transmitted using the plurality of physical wideband antennas in accordance with the at least one user virtual RF configuration. The at least one processor may cooperate with one or more of the wideband converters to wirelessly receive or transmit packets or frames of digital data according to the at least one user virtual RF configuration.

The method may include allowing users to configure, via the software interface, a number of virtual antennas by using the user virtual RF configuration to select which of the physical wideband converters to electronically combine to form the virtual antennas. The at least one user virtual RF configuration may also specify RF modulation/demodulation schemes pursuant to which ones of the wideband converters perform RF modulation or demodulation operations.

The combination remote wideband radiofrequency head and digitally controlled reconfigurable virtual antenna array further include a plurality of RF frequency up/down converters connected between the physical antennas and the physical antenna specific wideband converters. The user virtual RF configuration may specify the conversion frequencies utilized by the plurality of RF frequency up/down converters. At least some of the wideband converters may be configured to RF modulate or demodulate the packets or frames of digital data between RF waveforms and digital data in accordance with the user virtual RF configuration where such configuration may further define at least one I/Q RF modulation/demodulation scheme.

In one embodiment the user virtual RF configuration may specify RF characteristics of the virtual antennas, thereby defining customized virtual antennas. In one implementation at least some of the physical wideband antennas may have different characteristics. In this case the user virtual RF configuration may configure the characteristics of customized virtual antennas by selecting which of the physical antenna specific wideband converters are used to electronically combine ones of the physical wideband antennas of differing antenna characteristics.

The software interface may further be used to define the user virtual RF configuration so as to specify a directionality of the virtual antennas, thereby defining directional virtual antennas. This directionality may be effected by, for example, adjusting phases of at least one I/Q RF modulation/demodulation scheme implemented by the antenna specific wideband converters connected to ones of the physical antennas.

In one embodiment the physical wideband antennas are configured for operation over at least 1 GHz of bandwidth and/or over any base frequency between 600 MHz and 6 GHz.

In one embodiment the method contemplates enabling, via the software interface, a plurality of users (e.g., wireless carriers) to each configure, on a user specific basis, a user specific number of virtual antennas, RF modulation/demodulation schemes, and RF frequency ranges, thereby defining a plurality of user specific virtual RF configurations. In this case the at least one processor uses the plurality of user specific virtual RF configurations in connection with combining and/or distributing wireless signals received or transmitted using the plurality of physical wideband antennas according to the number of virtual antennas, RF modulation schemes, and RF frequency ranges defined by said plurality of user specific virtual RF configurations. The method may further include using the at least one processor and at least some of the wideband converters to wirelessly receive or transmit, on a user specific basis, packets or frames of digital data according to each user's specific virtual RF configuration.

In another aspect the disclosure is directed to a combination remote wideband radiofrequency head and reconfigurable virtual antenna array system. The system includes a plurality of physical wideband antennas. Each of the plurality of physical wideband antennas may be configured with physical antenna specific wideband converters including wideband analog to digital and digital to analog converters. The wideband converters may be controlled by at least one processor configured to execute instructions stored within a memory. The processor may define a software interface allowing users to configure a number of virtual antennas, RF modulation/demodulation schemes, and RF frequency ranges, thereby defining at least one user virtual RF configuration. The virtual antennas may be configured by, for example, establishing electrical connections between the plurality of physical wideband antennas or by otherwise combining signal received from, or by distributing signals to, combinations of the plurality of physical wideband antennas. The at least one processor may be further configured to use at least some of the wideband converters to wirelessly receive or transmit packets or frames of digital data according to the at least one user virtual RF configuration.

Discussion of Orthogonal Time Frequency Space (OTFS) wireless communications methods can be found in, for example, U.S. patent application Ser. Nos. 13/927,091; 13/927,086; 13/927,095; 13/927,089; 13/927,092; 13/927,087; 13/927,088; 13/927,091; 14/583,911, 15/152,464, and U.S. Pat. No. 9,071,285, the entire contents of each of which are incorporated herein by reference in their entirety.

While various embodiments have been described above, it should be understood that they have been presented by way of example only, and not limitation. They are not intended to be exhaustive or to limit the claims to the precise forms disclosed. Indeed, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated.

Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The foregoing description, for purposes of explanation, used specific nomenclature to provide a thorough understanding of the claimed systems and methods. However, it will be apparent to one skilled in the art that specific details are not required in order to practice the systems and methods described herein. Thus, the foregoing descriptions of specific embodiments of the described systems and methods are presented for purposes of illustration and description. They are not intended to be exhaustive or to limit the claims to the precise forms disclosed; obviously, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated. It is intended that the following claims and their equivalents define the scope of the systems and methods described herein.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded into one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of providing wireless communication services using configurable infrastructure including a plurality of physical antennas, the method comprising:

receiving, from a first wireless network operator, first virtual RF configuration information including a first antenna configuration, the first antenna configuration specifying a first favored antenna direction and a first virtual antenna type;

receiving, from a second wireless network operator, second virtual RF configuration information including a second antenna configuration different from the first antenna configuration;

configuring, based upon the first virtual RF configuration information, a first portion of the configurable infrastructure and a first set of the plurality of physical antennas into a first virtual RF configuration including a first virtual antenna having the first favored antenna direction and being of the first virtual antenna type wherein the first virtual antenna is created based upon the first antenna configuration and includes two or more of the plurality of physical antennas;

configuring, based upon the second virtual RF configuration information, a second portion of the configurable infrastructure and a second set of the plurality of physical antennas into a second virtual RF configuration including a second virtual antenna wherein the second virtual antenna is created based upon the second antenna configuration and wherein at least one of the plurality of physical antennas is included in the first set and the second set;

establishing, using the first virtual RF configuration, a connection between the configurable infrastructure and a first wireless subscriber device of the first wireless network operator; and establishing, using the second virtual RF configuration, a connection between the configurable infrastructure and a second wireless subscriber device of the second wireless network operator wherein the at least one of the plurality of physical antennas is used simultaneously for communication with the first wireless subscriber device and the second wireless subscriber device.

2. The method of claim 1 wherein the configurable infrastructure includes, in association with each of the plurality of physical antennas, at least one of an analog-to-digital converter and a digital-to-analog converter and at least one of an RF frequency upconverter and RF frequency downconverter.

3. The method of claim 1 wherein the first virtual RF configuration information includes first air interface information, the first air interface information defining a first air interface associated with the first wireless network operator and wherein the second virtual RF configuration information includes second air interface information, the second air interface information defining a second air interface associated with the second wireless network operator.

4. The method of claim 3 wherein the first air interface information is associated with a first wireless communications protocol utilized by the first wireless network operator and the second air interface information is associated with a second wireless communications protocol utilized by the second wireless network operator, the first wireless communications protocol being different from the second wireless communications protocol.

5. The method of claim 4 further including transmitting data to the first wireless subscriber device in accordance with the first wireless communications protocol and transmitting data to the second wireless subscriber device in accordance with the second wireless communications protocol.

6. The method of claim 5 further including receiving data from the first wireless subscriber device in accordance with the first wireless communications protocol and receiving data from the second wireless subscriber device in accordance with the second wireless communications protocol.

7. The method of claim 1 wherein the configuring the first set of the plurality of physical antennas includes combining signals provided to or received from ones of the first set of the plurality of physical antennas.

8. The method of claim 1 further including receiving, from the first wireless network operator, a plurality of virtual RF configurations wherein each of the plurality of virtual RF configurations includes information specifying one or more virtual antennas, at least one of an RF modulation and RF demodulation scheme, and at least one RF frequency range and wherein the first virtual RF configuration is included within the plurality virtual RF configurations.

9. The method of claim 1 wherein the configuring the first set of the plurality of physical antennas includes defining a first directionality of the first virtual antenna and wherein the configuring the second set of the plurality of physical antennas includes defining a second directionality and a second virtual antenna type of the second virtual antenna wherein the first directionality is different from the second directionality and wherein the first virtual antenna type is different from the second virtual antenna type.

10. The method of claim 1 wherein the configurable infrastructure includes a plurality of RF frequency up/down converters, the first virtual RF configuration information specifying a first conversion frequency associated with a first set of the plurality of RF frequency up/down converters and the second virtual RF configuration information specifying a second conversion frequency associated with a second set of the plurality of RF frequency up/down converters wherein the first frequency is different from the second frequency.

11. The method of claim 10 wherein the reconfigurable infrastructure includes a plurality of wideband converters, the plurality of RF frequency up/down converters being connected between the plurality of physical antennas and the plurality of wideband converters.

12. A system including configurable infrastructure for providing wireless services, the system including:
a plurality of physical antennas;
a corresponding plurality of wideband digital/RF converters connected to the plurality of physical antennas;
at least one processor; and
memory coupled to the processor, the memory including program code which when executed by the at least one processor causes the at least one processor to:
receive, from a first wireless network operator, first virtual RF configuration information including a first antenna configuration, the first antenna configuration specifying a first favored antenna direction and a first virtual antenna type;
receive, from a second wireless network operator, second virtual RF configuration information including a second antenna configuration different from the first antenna configuration;
configure, based upon the first virtual RF configuration information, one or more of the plurality of wideband digital/RF converters and a first set of the plurality of physical antennas into a first virtual RF configuration including a first virtual antenna having the first favored antenna direction and being of the first virtual antenna type wherein the first virtual antenna is created based upon the first antenna configuration and includes two or more of the plurality of physical antennas;
configure, based upon the second virtual RF configuration information, at least one of the plurality of wideband digital/RF converters and a second set of the plurality of physical antennas into a second virtual RF configuration including a second virtual antenna wherein the second virtual antenna is created based upon the second antenna configuration and wherein at least one of the plurality of physical antennas is included in the first set and the second set;
establish, using the first virtual RF configuration, a connection between the configurable infrastructure and a first wireless subscriber device of the first wireless network operator; and
establish, using the second virtual RF configuration, a connection between the configurable infrastructure and a second wireless subscriber device of the second wireless network operator wherein the at least one of the plurality of physical antennas is used simultaneously for communication with the first wireless subscriber device and the second wireless subscriber device.

13. The system of claim 12 wherein each of the corresponding plurality of wideband digital/RF converters includes at least one of an analog-to-digital converter and a digital-to-analog converter associated with each of the plurality of physical antennas.

14. The system of claim 12 wherein the first virtual RF configuration information includes first air interface information, the first air interface information defining a first air interface associated with the first wireless network operator and wherein the second virtual RF configuration information includes second air interface information, the second air interface information defining a second air interface associated with the second wireless network operator.

15. The system of claim 14 wherein the first air interface information is associated with a first wireless communications protocol utilized by the first wireless network operator and the second air interface information is associated with a second wireless communications protocol utilized by the second wireless network operator, the first wireless communications protocol being different from the second wireless communications protocol.

16. The system of claim 15 wherein the program code further includes program code which when executed by the at least one processor causes the at least one processor to transmit data to the first wireless subscriber device in accordance with the first wireless communications protocol and transmit data to the second wireless subscriber device in accordance with the second wireless communications protocol.

17. The system of claim 16 wherein the program code further includes program code which when executed by the at least one processor causes the at least one processor to receive data from the first wireless subscriber device in accordance with the first wireless communications protocol and receive data from the second wireless subscriber device in accordance with the second wireless communications protocol.

18. The system of claim 12 wherein the program code causing the at least one processor to configure the first set of the plurality of physical antennas includes program code causing the at least one processor to combine signals provided to or received from ones of the first set of the plurality of physical antennas.

19. The system of claim 12 wherein the program code further includes program code which when executed by the at least one processor causes the at least one processor to receive, from the first wireless network operator, a plurality of virtual RF configurations wherein each of the plurality of virtual RF configurations includes information specifying one or more virtual antennas, at least one of an RF modulation and RF demodulation scheme, and at least one RF frequency range and wherein the first virtual RF configuration is included within the plurality virtual RF configurations.

20. The system of claim 12 wherein the program code causing the at least one processor to configure the first set of the plurality of physical antennas includes program code causing the at least one processor to define a first directionality of the first virtual antenna and wherein the program code causing the processor to configure the second set of the plurality of physical antennas includes program code causing the processor to define a second directionality and a second virtual antenna type of the second virtual antenna wherein the first directionality is different from the second directionality and wherein the first virtual antenna type is different from the second virtual antenna type.

21. The system of claim 12 wherein the configurable infrastructure includes a plurality of RF frequency up/down converters, the first virtual RF configuration information specifying a first conversion frequency associated with a first set of the plurality of RF frequency up/down converters and the second virtual RF configuration information specifying a second conversion frequency associated with a second set of the plurality of RF frequency up/down converters wherein the first frequency is different from the second frequency.

22. The system of claim 12 wherein the each of the plurality of wideband digital/RF converters includes an RF frequency up/down converter and at least one of an analog-to-digital converter and a digital-to-analog converter.

23. The system of claim 12 wherein the memory further includes program instructions executable by the at least one processor for implementing first modulation and first demodulation operations associated with the first wireless network operator and second modulation and second demodulation operations associated with the second wireless network operator.

\* \* \* \* \*